(12) United States Patent
Tajima et al.

(10) Patent No.: US 6,777,922 B2
(45) Date of Patent: Aug. 17, 2004

(54) INFORMATION PROCESSING APPARATUS FOR INPUTTING A SIGNAL, AND METHOD THEREFOR

(75) Inventors: Shigeru Tajima, Kanagawa (JP); Junichi Rekimoto, Tokyo (JP); Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 10/145,451

(22) Filed: May 13, 2002

(65) Prior Publication Data

US 2002/0185999 A1 Dec. 12, 2002

(30) Foreign Application Priority Data

May 14, 2001 (JP) .................................... 2001-143868
Jun. 7, 2001 (JP) .................................... 2001-172373

(51) Int. Cl.[7] ............................................. H01F 30/12
(52) U.S. Cl. .................... 324/76.75; 341/33; 455/41.1
(58) Field of Search .................. 341/33, 20; 324/76.75; 455/41.1

(56) References Cited

U.S. PATENT DOCUMENTS

| | | | | |
|---|---|---|---|---|
| 3,866,112 A | * | 2/1975 | Yokoyama et al. ............ 334/15 |
| 4,550,310 A | * | 10/1985 | Yamaguchi et al. ........... 307/99 |
| 5,465,091 A | * | 11/1995 | Nishino et al. .............. 324/686 |
| 5,914,701 A | * | 6/1999 | Gersheneld et al. ......... 345/156 |
| 6,211,799 B1 | * | 4/2001 | Post et al. ..................... 341/33 |
| 6,223,018 B1 | * | 4/2001 | Fukumoto et al. .......... 455/41.1 |

* cited by examiner

Primary Examiner—N. Le
Assistant Examiner—Timothy J. Dole
(74) Attorney, Agent, or Firm—Frommer Lawrence & Haug LLP; William S. Frommer; Samuel L. Lee

(57) ABSTRACT

When a human body touches any of linear electrode array mutually isolated and arranged in X and Y directions of an input device, an inducing signal from wiring of a commercial power supply is transmitted by way of the human body, so that an inducing voltage is generated at the linear electrode to which the human body touches. The input device detects the inducing voltage and outputs the detected inducing voltage to a signal processing section. The signal processing section detects a coordinate where the input device detects the inducing voltage, identifies a frequency of the inducing signal transmitted by way of the human body, and outputs the information to an output terminal.

19 Claims, 28 Drawing Sheets

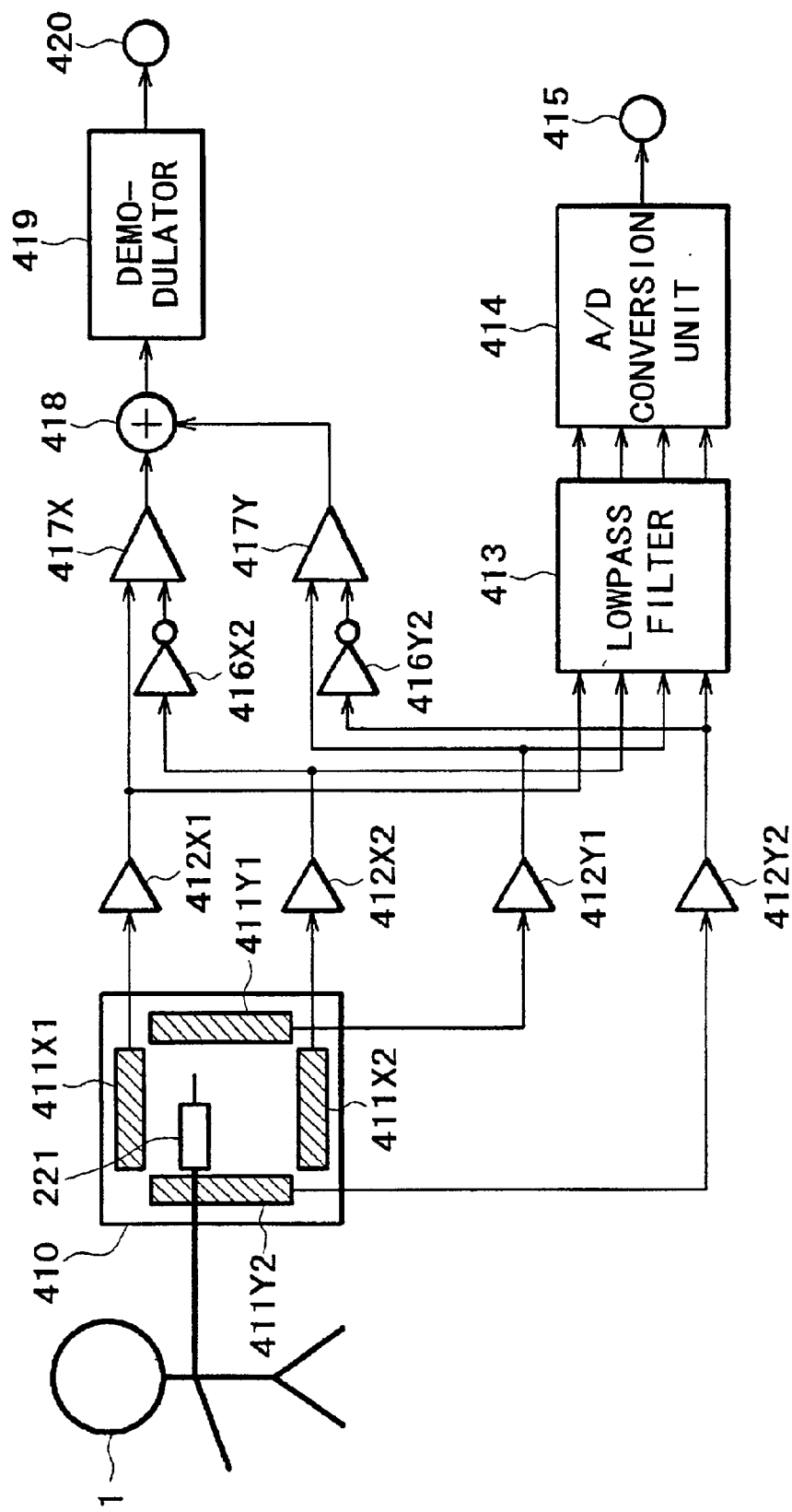

INFORMATION PROCESSING APPARATUS FOR INPUTTING A SIGNAL, AND METHOD THEREFOR

BACKGROUND OF THE INVENTION

1. Field of the Invention

The present invention relates to an information processing apparatus. In particular, the present invention relates to an information processing apparatus capable of identifying an existence of a user without making the user notice the apparatus. Further, the present invention relates to an information processing apparatus and method capable of detecting a coordinate by using an inducing voltage from a human body.

2. Description of the Related Art

For example, a sensor that senses a human body is provided e.g. when an electronic appliance such as a computer is activated only at the timing when the appliance is used. Then, the electrical appliance is made to be in a state where the appliance can be operable when the human body is sensed with the sensor.

More specifically, an input device having a transparent electrode and superposed on a display screen of a computer or the like is widely used. In such input device, a signal detecting operation is executed by detecting a high frequency signal (radio frequency signal) or the like generated by pressure or by an input pen.

Additionally, in a large-sized display screen such as a display screen used for a projector, there is a method of recognizing an image of a finger using a video camera in addition to the above-mentioned method.

However, in the above-mentioned method, there is a problem that a human body can be naturally sensed even only when the human body merely passes through near the sensor, resulting in that an electrical appliance becomes to be in a state where the appliance is activated. Further, in a conventional method, there is a problem that a user must use a specified pen when such a high frequency signal is used. Further, when utilizing pressure for detection, there is a problem that the user or the finger issuing instructions are not identified. Further, when an image recognition of a finger is executed using a video camera, there is a problem that the finger must be not in a dead angle of the video camera, resulting in that the device tends to become complicated.

The present invention is done in view of such problems that can surely identify an existence of a user without making the user notice a device relating of the invention. Namely, the device relating to the present invention can detect an input coordinate by a simplified construction.

SUMMARY OF THE INVENTION

An information apparatus of the present invention comprises: a generator that generates an alternating current signal; and an induction unit that has the alternating current signal generated by the generator and induced to a human body.

The generator can generates an alternating current signal that can be identified with respect to the alternating current signal generated by the other information processing apparatus.

In the information processing apparatus of the invention, a signal is generated and thus generated signal is induced to a human body.

More specifically the information processing apparatus comprises: an induction unit that extends in a first and a second directions and induces an inducing voltage from a neighboring human body; an induced voltage detection unit that detects the inducing voltage induced by the induction unit; and an coordination detection unit that detects a coordination at which the induction unit induces the inducing voltage.

Further, the information processing apparatus can have a frequency identification unit for identifying a frequency of the inducing voltage. Further, the frequency identification unit can identify a frequency of the commercial power supply as the frequency of the inducing voltage.

The frequency identification unit can identify a frequency of the signal outputted from the other information processing apparatus that is worn on the human body as the frequency signal of the inducing voltage.

The information processing apparatus can have a reception unit that receives information transmitted from the other information processing apparatus that is worn on the human body.

The information processing apparatus can have a transmission unit that transmits, by way of the human body, information to the other information processing apparatus that is worn on the human body.

An information processing method of the present invention comprises the steps of: an induction step of inducing an inducing voltage from a neighboring human body that extends in a first direction and a second direction; an induced voltage detection step of detection the inducing voltage that is induced at the induction step; and a coordinate detection step of detecting a coordinate that induces the inducing voltage at the induction step, based on the inducing voltage that is detected at the induced voltage detection step.

In the information processing apparatus and method of the present invention, an inducing voltage from a human body can be detected. On the basis of the inducing voltage that is detected, a coordinate at which the inducing voltage is generated can be detected. Thus, the information processing apparatus of the present invention can identify existence of a user (human body) without making the user notice the apparatus. The information processing apparatus and method of the present invention can detect a coordinate using a simplified construction.

BRIEF DESCRIPTION OF THE DRAWINGS

In the accompanying drawings:

FIG. 30 shows an example of construction in which an input device constructed by a resistor array formed in a manner is used.

DETAILED DESCRIPTION OF THE PREFERRED EMBODIMENTS

Figure 1:
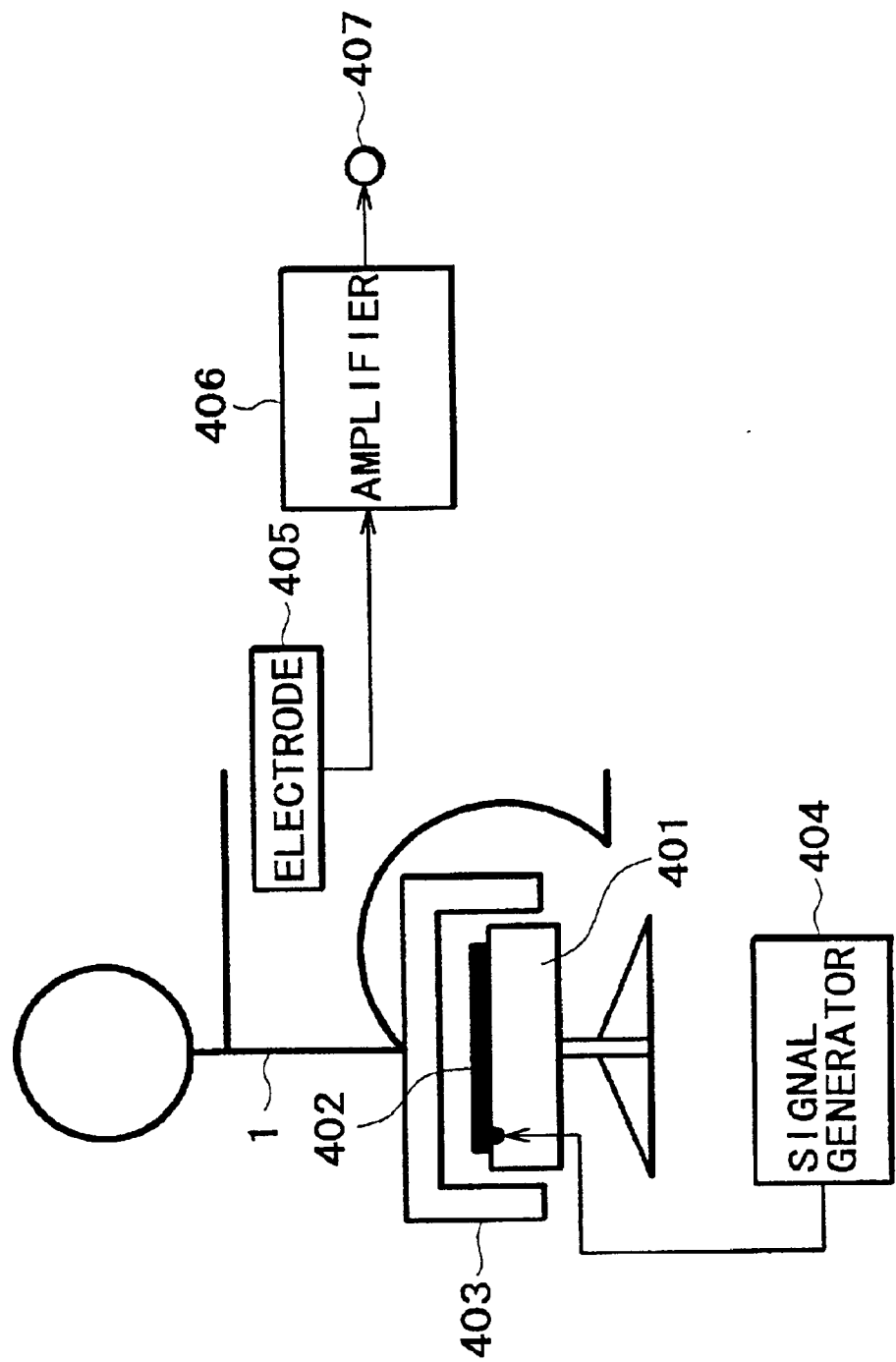
FIG. 1 shows a basic principle of the present invention.

FIG. 1 shows a basic principle of the present invention. An electrode 402 is amounted to a top-sitting surface of a chair 401 on which a human body 1 sits. An electrode 402 is covered with a cover 403. A signal generator 404 is connected to the electrode 402 and generates an alternating current signal of a sine wave, a rectangular wave or the like.

The cover 403 is provided for protecting the electrode 402 that is formed by materials having a thickness by which a signal generated by the signal generator 404 can be transmitted (induced) to the human body 1 byway of the electrode 402. An electrode 405 is disposed at a position where touching action of finger of the human body 1 can be detected, e.g. a predetermined position of a keyboard to be operated when operating a computer. The signal detected thereby is amplified by an amplifier 406 to output the same to an output terminal 407.

Following will be explained about the operation. When the human body 1 sits on the chair 401 whose top-sitting surface is covered with the cover 403, a signal generated by the signal generator 404 is transmitted (induced) to the human body 1 by way of the electrode 402. When the human body 1 touches to the electrode 405 by way of the finger or the like, or closely approaches the electrode 405, the electrode 405 has the signal transmitted (induced) by way of the human body induced. The induced signal is outputted to the amplifier 406. The amplifier 406 amplifies a signal supplied from the electrode 405 to output the amplified signal to the output terminal 407.

An experiment as for the information transmitting system, to which the present invention is applied, as above-mentioned, is performed under following conditions.

Figure 2:
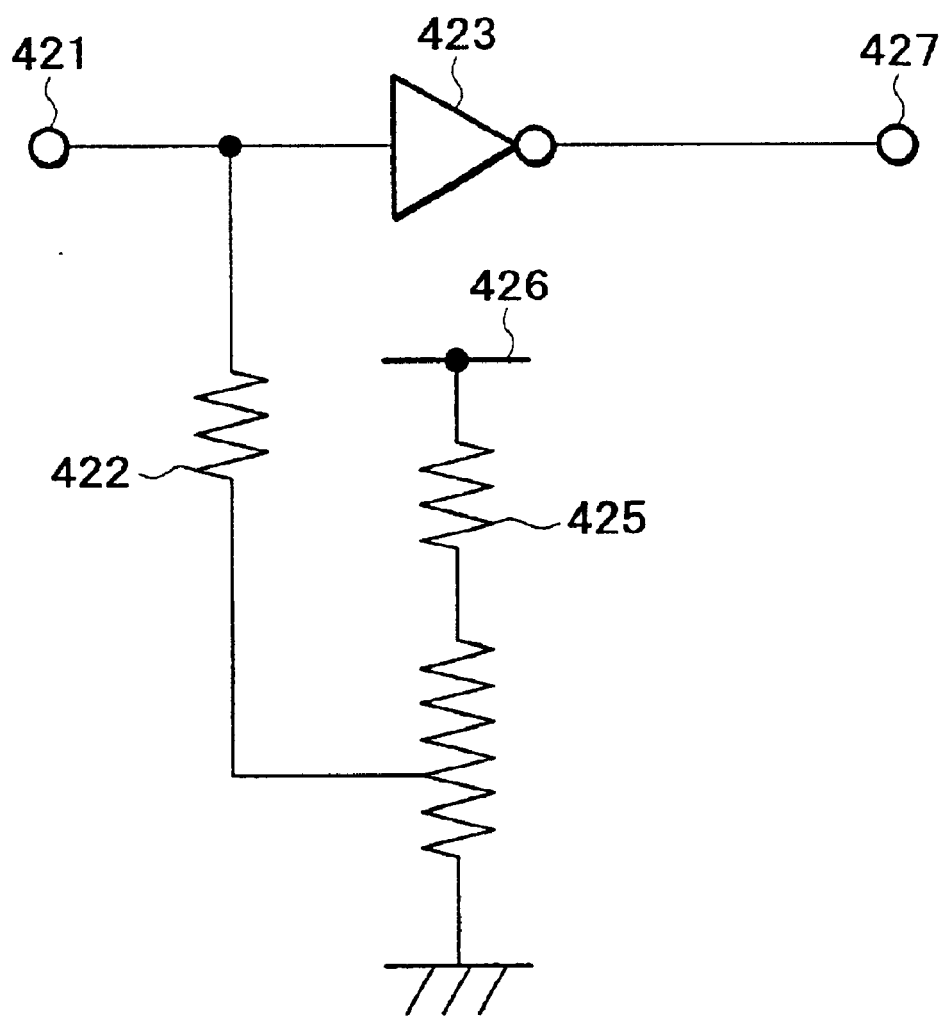
FIG. 2 shows a construction of inside of an amplifier 406 of FIG. 1.

As the chair 401, a chair having around top-sitting surface over which vinyl is covered and having a diameter of 40 cm is employed. The electrode 402 is made of a square copper foil whose size is 20 cm×20 cm. The cover 403 is made of a cushion material whose thickness is substantially 1 mm and made of expandable vinyl. A signal output level of the signal generator 404 is defined by substantially 4 Vpp (peak-to-peak voltage). The waveform of the output signal is formed by a sine wave or a rectangular wave. The frequency of the output signal is defined by substantially 500 Hz to 1 MHz. FIG. 2 shows a construction of inside of the amplifier 406 used for the present experiment. A signal inputted from an input terminal 421 is inputted to a Schmitt trigger inverter 423 formed by a CMOS (complementary metal-oxide semiconductor). Specifically, the Schmitt trigger inverter 423 formed by the CMOS is the MC14584B manufactured by MOTOROLA Inc. A resistor 422 has a high resistance element that supplies a bias voltage to the input terminal 421. When there is no inducing operation at the input terminal 421, the resistor 422 makes a voltage of the input terminal 421 to a zero level. Further, the resistor 422 has high resistance in order to efficiently use an inducing voltage, whose resistance value is defined as substantially 2 MΩ. A variable resistor 424 and a resistor 425 are used for adjustment and setting of a bias level. By varying the variable resistor 424, the input level of Schmidt trigger inverter 423 can be close to a threshold level of the CMOS. This operation can adjust inducing detection sensitivity, too. A constant voltage source 426 is set to be 5 V. The output signal of Schmidt trigger inverter 423 is outputted to an output terminal 427.

Following will be explained about the operation. A signal inputted to the input terminal 421 is converted into a rectangular wave to be amplified by the Schmidt trigger inverter 423. Further, the amplified signal is inverted and is outputted to an output terminal 427 by the Schmidt trigger inverter 423.

As a result of the above experiment, a logic level signal whose shape is a rectangular wave, outputted from the signal generator 404 can be obtained from the signal output terminal 407 of FIG. 1. Further, the electrode 402 is not limited to the above-mentioned size. Namely, even when the electrode 402 is downsized, a transmitting signal can be detected.

Through such above-mentioned construction, when the user touches the electrode 402 with the finger or closely approach the electrode 402, a signal to be transmitted by way of the human body 1 can be detected that is stable over in a wide frequency area. Further, by properly setting the signal level or the detection level of the amplifier 406, the transmission signal can be detected as long as the human body 1 touches it.

Figure 3:
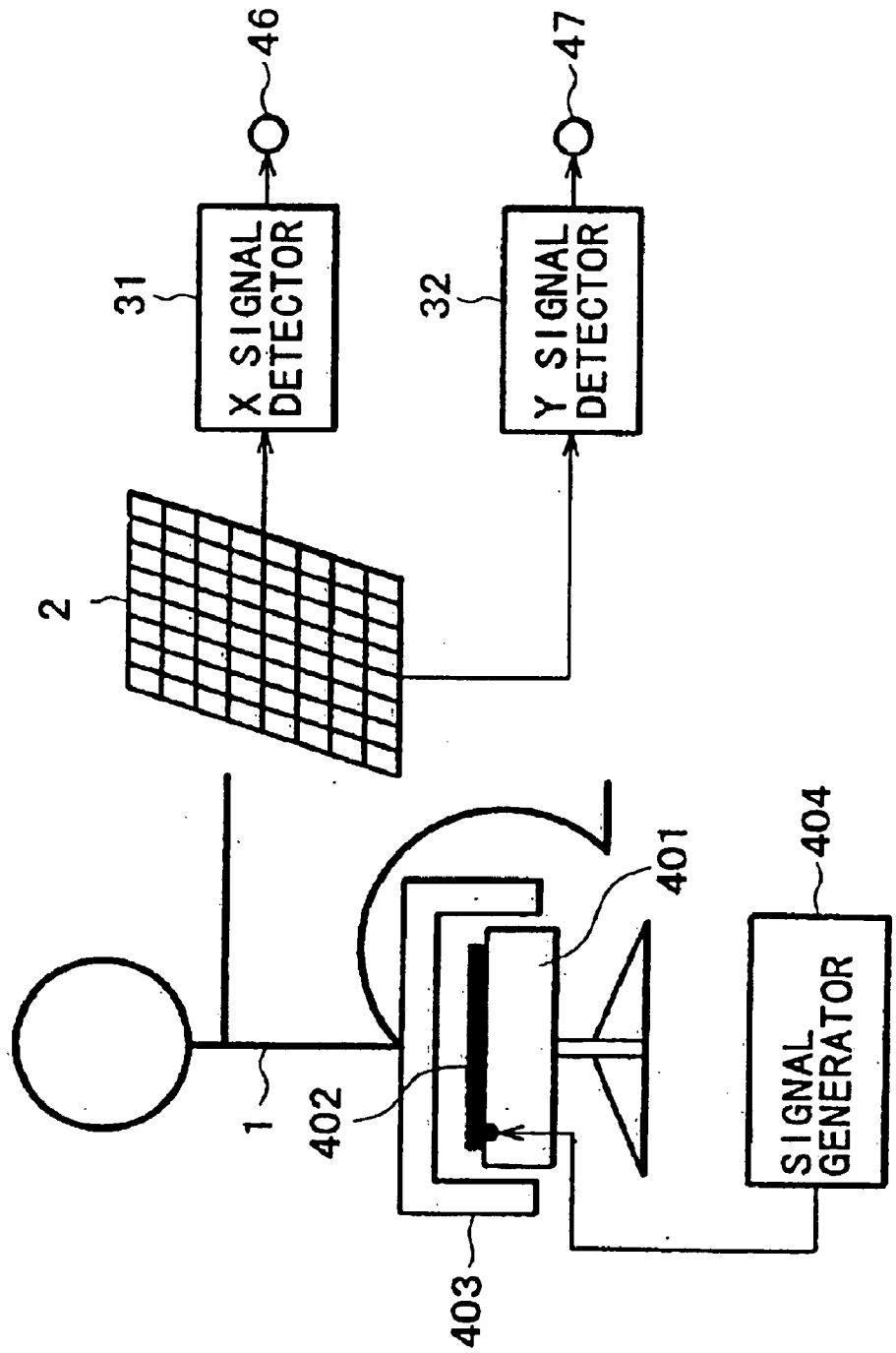
FIG. 3 shows a construction of an information transmitting system to which the present invention is applied.

FIG. 3 shows an example of a specific construction of an information transmitting system to which the present invention is applied. Like FIG. 1, the electrode 402 is mounted to the sitting surface of the chair 401 and covered with the cover 403. The signal generator 404 supplies an outputted signal to the electrode 402. An X signal detecting unit 31 and a Y signal detecting unit 32 detect an inducing voltage generated by an inputting device 2. The X signal detecting unit 31 outputs a detection result to an X signal out put terminal 46. The Y signal detecting unit 32 detects a detection result to a Y signal output terminal 47.

Following will be explained about the operation. When a user sits on the chair 401 covered with the cover 403, a signal generated at a predetermined frequency by the signal generator 404 is transmitted to the human body 1 by way of the electrode 402. When the human body 1 touches the input device 2 with the finger or approaches the device 2, an inducing voltage is generated in the input device 2 by a transmission signal transmitted by way of the human body 1. The X signal detecting unit 31 and the Y signal detecting unit 32 detect the inducing voltage generated in the input device 2. Each of the inducing voltages detected by the X signal detecting unit 31 and the Y signal detecting unit 32 is outputted from the X signal output terminal 46 and the Y signal output terminal 47.

Figure 4:
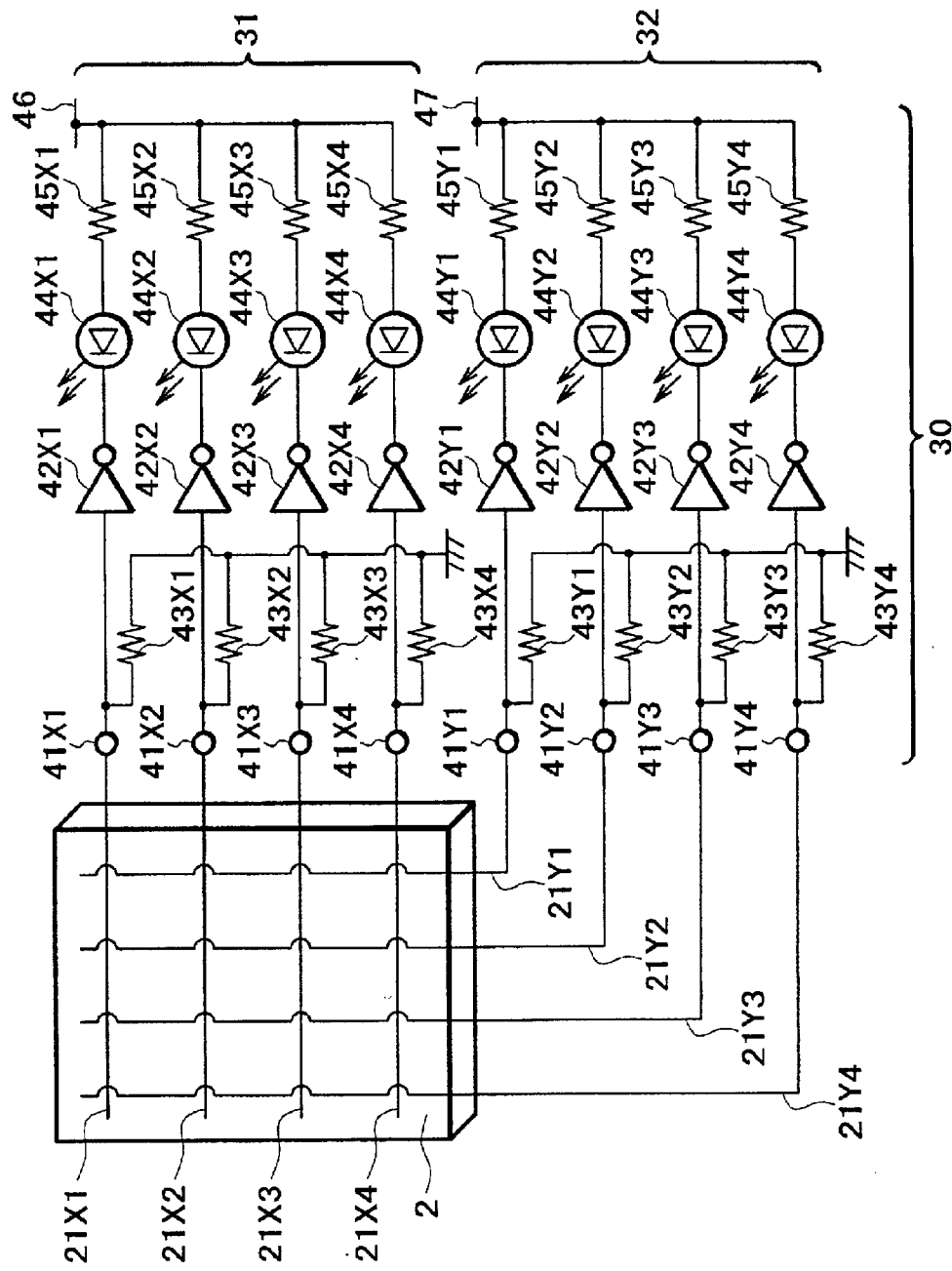
FIG. 4 shows a principle of the input device 2, an X signal detecting unit 31, and a Y signal detecting unit 32.

FIG. 4 shows an example of construction of the input device 2, the X signal detecting unit 31, and the Y signal detecting unit 32. The input device 2 has linear electrodes 21Xi and 21Yi (i=1, 2, 3, 4, . . . ) that are mutually insulated. In this example, the number of the linear electrodes 21Xi and 21Yi is arranged by four by in each of the X direction and the Y direction. Further, the X electrode detecting unit 31 and the Y electrode detecting unit 32 construct an induced voltage detecting unit 30 that includes the X electrode detecting unit 31 that detects an inducing voltage of the linear electrodes 21Xi array extended in the X direction and the Y electrode detecting unit 32 that detects an inducing voltage of the linear electrodes 21Yi array extended in the Y direction.

Here, the number of the linear electrodes 21Xi and 21Yi are respectively f our in each of the X direction and the Y direction. It is not limited to four, and the number of the linear electrodes 21Xi and 21Yi depends on a minute extent of a detection coordinate dimensioning.

Figure 5:
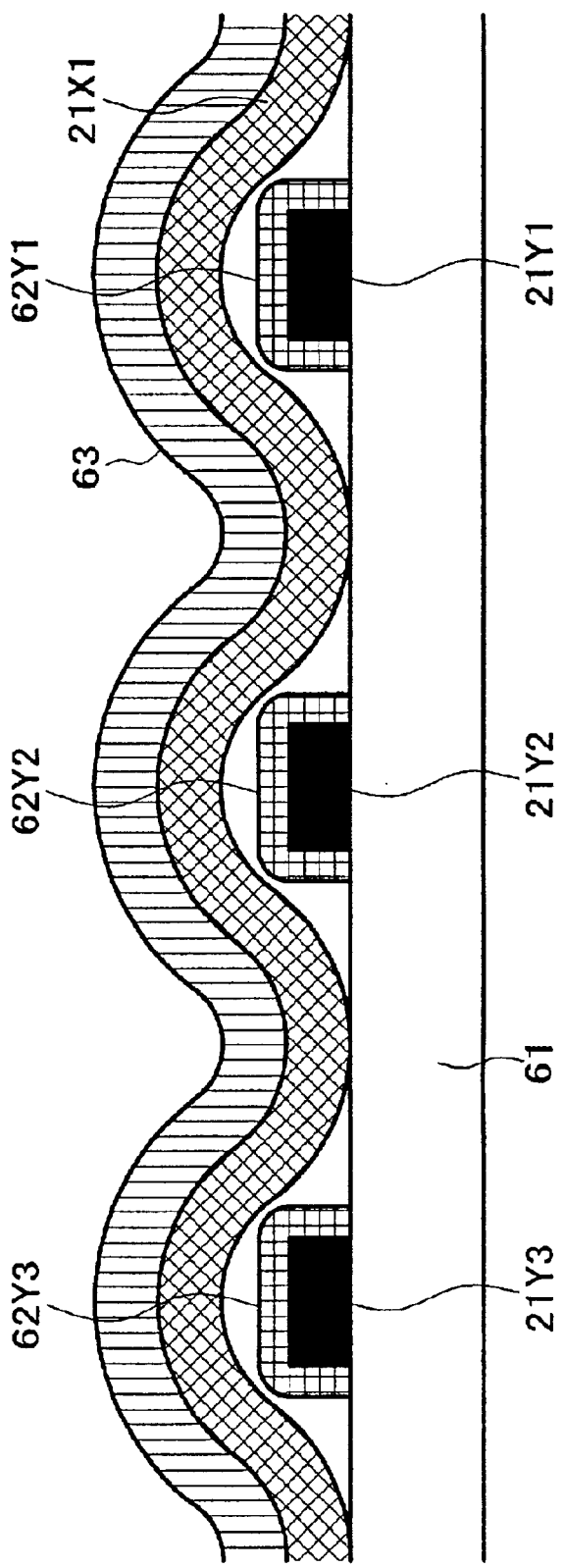
FIG. 5 is a sectional view showing an example of construction of section in an X direction of the input device 2 of FIG. 4.

FIG. 5 is a sectional view showing an example of construction of section in the X direction on the linear electrodes 21X1 of the input device 2. The linear electrodes 21Y to 21Y3 are arranged in the Y direction on a substrate 61. The linear electrodes 21Y1 to 21Y3 are covered with insulators 62Y1 to 62Y3 and are insulated against the linear electrode 21X1 arranged in the X direction. An insulator 63 is provided for protecting all the portions that may be omitted depending on the case. Further, though the surf ace is formed in a wave-shaped manner as shown, the surf ace may be formed in a flat-shaped manner.

Figure 6:
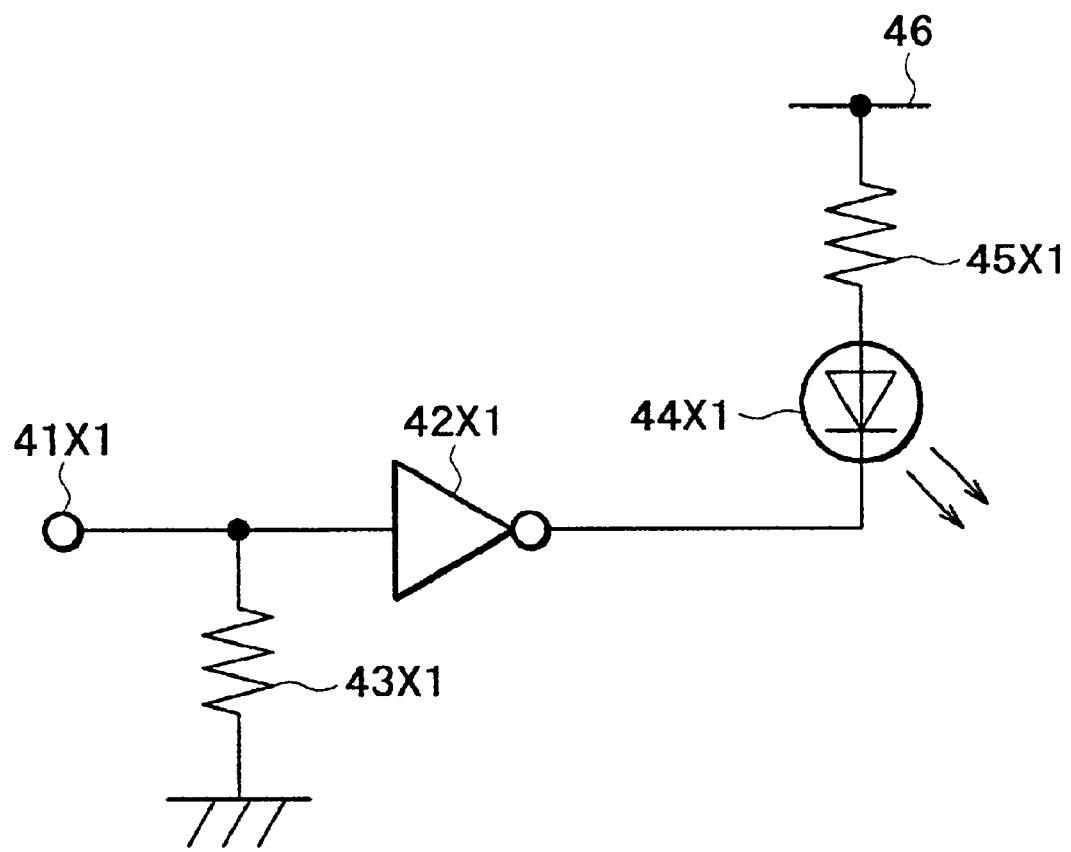
FIG. 6 is a circuit diagram showing an example of construction of one section of the detecting unit 32 of FIG. 4.

FIG. 6 is an enlarged view of the detecting unit that detects an inducing voltage of one linear electrode 21X1 in the induced voltage detecting unit 30. The signal induced to the linear electrode 21X1 (refer to FIG. 4) of the input device 2 is supplied to an inverter buffer 42X1 by way of an input terminal 41X1. Further, an input of the inverter buffer 42X1 is e.g. grounded byway of a resistor 43X1 having high resistance such as a resistor having the value of 3.3 MΩ. One end of an LED (light emitting diode) 44X1 is connected to the output of the inverter buffer 42X1. The other end thereof is connected to a reference voltage source 46 by way of a resistor 45X1. For example, a "14049" that is a standard gate of a CMOS (complementary metal-oxide semiconductor) is available as the inverter buffer 42X1.

It is noted that because the construction of the detecting unit that detects inducing voltages of the linear electrodes 21X2 to 21X4 and 21Y1 to 21y4 of the input device 2 is substantially as same as that of the detecting unit that detects an inducing voltage of the linear electrode 21X1 shown in FIG. 6.

Figure 7:
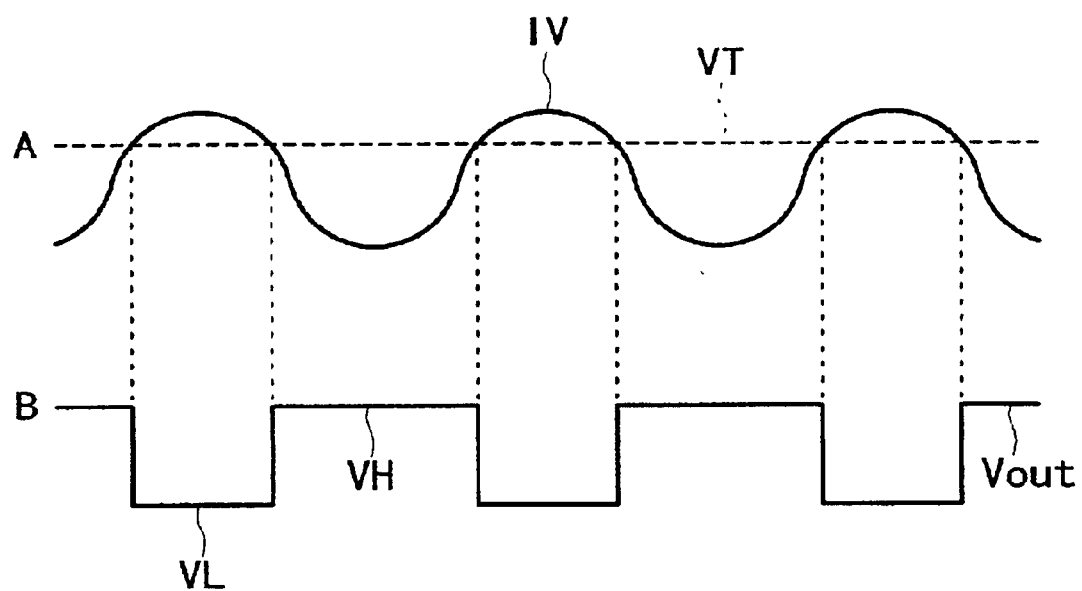
FIG. 7 shows an example of a waveform for explaining about an operation of the one section of the detecting unit 31 of FIG. 6.

FIGS. 7A and 7B show a view showing waveforms of the operation of the inverter buffer 42X1. In FIG. 7A, a signal IV denotes an input signal of the inverter buffer 42X1 and a voltage VT denotes a threshold voltage of the inverter buffer 42X1. In FIG. 7B, a signal Vout denotes an output signal of the inverter buffer 42X1. A voltage VH denotes a high level portion of the output signal Vout. A voltage VL denotes a low level portion of the output signal Vout.

The signal IV that is induced to the linear electrode 21X1 of the input device 2 is inputted to the inverter buffer 42X1. Then, a voltage of the output signal Vout is changed over either the high level VH or the low level VL, depending on whether or not the voltage of the signal IV lies over a threshold voltage (e.g. in case of the CMOS gate "14049", the threshold voltage is substantially half of the power supply voltage). In other words, when the inducing voltage IV being an input signal lies over the threshold voltage VT, a voltage of the output signal Vout becomes a voltage of the low level VL. On the other hand, when the inducing voltage IV being an input signal does not reach the threshold voltage VT, a voltage of the output signal Vout becomes the high level VH.

It is noted that because waveforms of operation of the inverter buffers 42X2 to 42X4 and 42Y1 to 42y4 are substantially as same as those of operation of the inverter buffer 42X1 shown in FIGS. 7A and 7B, the explanation of these waveforms are omitted.

Following will be explained about the operation. When the human body 1 does not touch the input device 2, any inducing voltage is generated in the linear electrodes 21Xi and 21Yi. In this case, an input portion of the inverter buffer 42X1 is grounded by way of the resistor 43X1, so that the inducing voltage IV of the inverter buffer 42X1 does not reach the threshold voltage VT (refer to FIG. 7A) and a voltage of the output signal Vout is a voltage of the high level VH (refer to FIG. 7B)1. As a result, the LED 4X1 is not illuminated.

When the human body 1 touches e.g. the linear electrode 21X1 of the linear electrodes array of the input device 2, the inducing voltage IV (refer to FIG. 7A) owing to a commercial alternating current power supply under a predetermined frequency is generated at the linear electrode 21X1 by way of the human body 1. The frequency of the commercial alternating current power supply depends on an area where the power supply is available. When the inducing voltage IV is generated at the linear electrode 21X1, the inducing voltage IV is supplied to the inverter buffer 42X1 by way of the input terminal 41X1. When a value of the inducing voltage IV lies over the threshold voltage VT, the output signal Vout of the inverter buffer 42X1 becomes at the low level VL. Then, the LED 44X1 is illuminated.

It is noted that because the operation of the detecting unit that detects inducing voltages of the other linear electrodes 21X2 to 21X4 and 21Y1 to 21y4 of the input device 2 is substantially as same as that of the detecting unit that detects an inducing voltage of the linear electrode 21X1 shown in FIG. 6.

Thus, the LEDs 44Xi and 44Yi corresponding to the linear electrode to which the human body 1 touches are illuminated in synchronization with the inducing voltage. (It is noted that this "illuminated" is strictly speaking, "flickered". However, the illumination can be almost recognized against human eyes.)

The user can recognize a coordinate of the position the human body 1 touched through the illumination of the LEDs 44Xi and 44Yi. The threshold voltage VT is provided for setting a detection sensitivity of the detecting unit. The user replaces the inverter buffer 42X1 of FIG. 6 by the high input impendence amplifier and thereafter the user sets the gain of the amplifier, so that the detection sensitivity can be freely selected.

Figure 8:
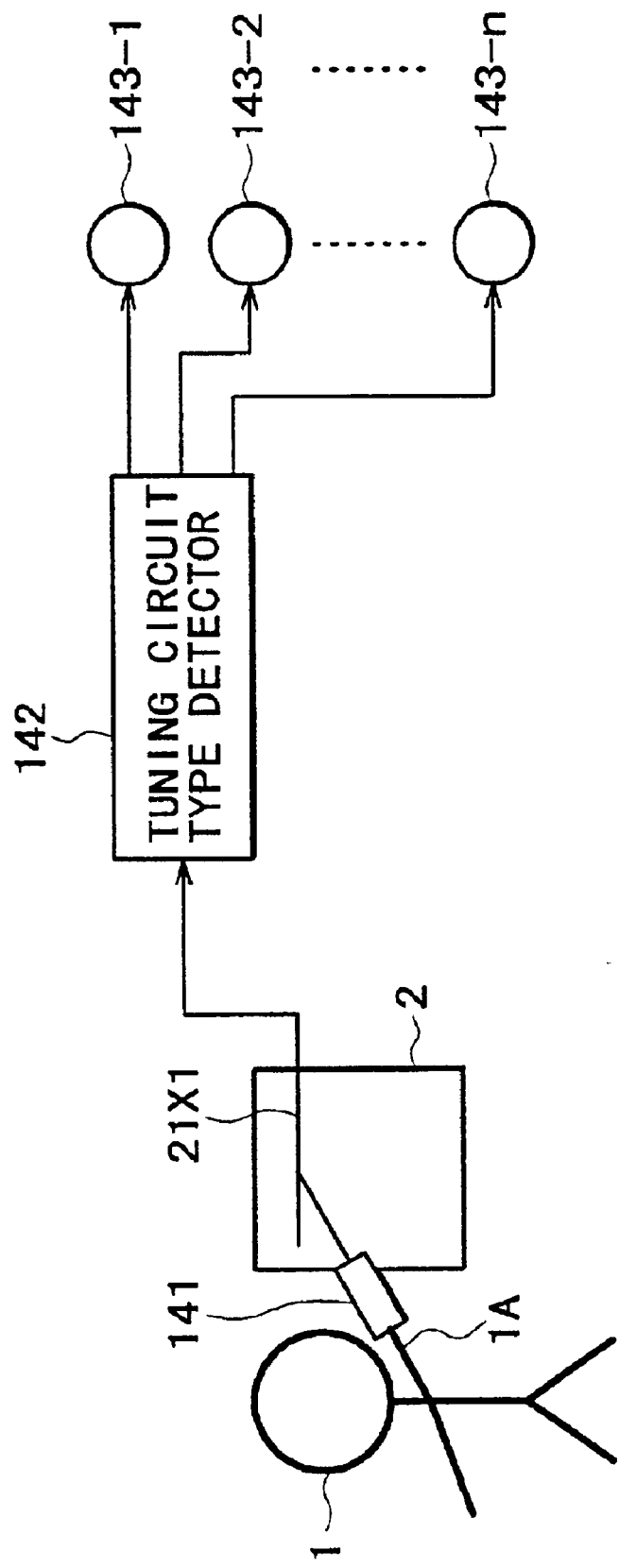
FIG. 8 shows an example of the other construction of an information transmitting system to which the present invention is applied.

Further, a plurality of users can be identified, by changing frequency of signal generated by the signal generator 404 by each of signal generations. FIG. 8 shows a basic construction of the information transmitting system that identifies frequency of a plurality of signals.

A transmitter 141 is worn on the human body 1. A tuning circuit type detecting unit 142 is connected to the linear electrode 21X1 of the input device 2, detects an inducing voltage generated by the linear electrode 21X1, identifies the frequency of the inducing voltage, and outputs a detection signal to output terminals 143-1 to 143-n corresponding to any identified frequency.

Figure 9:
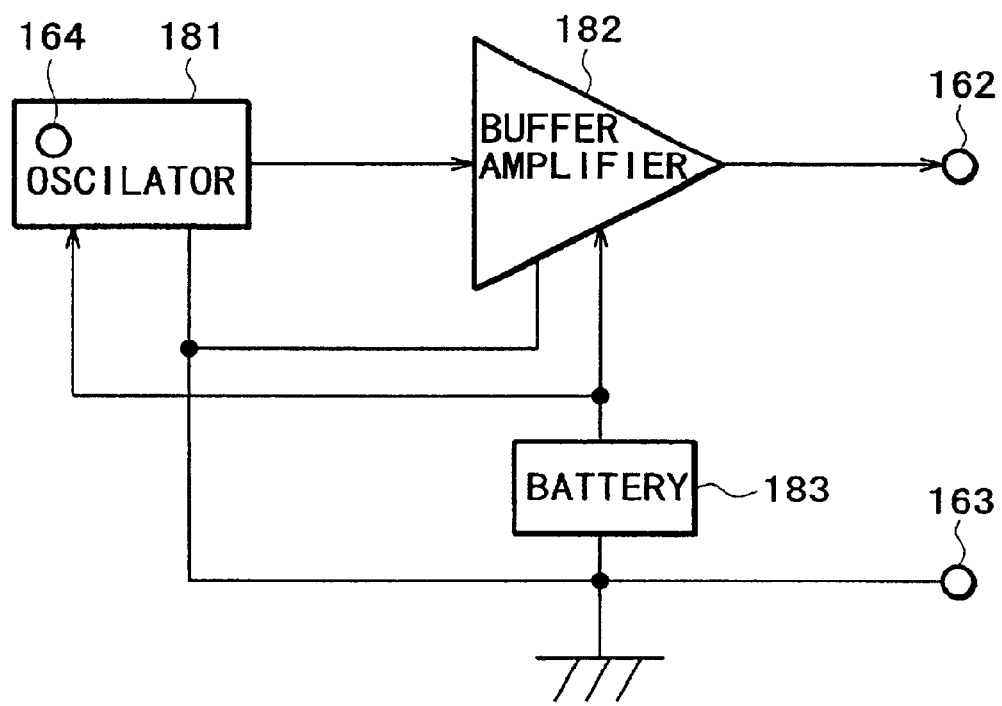
FIG. 9 shows a construction of inside of a transmitter 141 of FIG. 8.

FIG. 9 shows an example of construction of inside of the transmitter 141. An oscillator 181 generates an oscillation signal, i.e. generates a signal of a preset and predetermined frequency, and outputs the signal to a buffer amplifier 182. The buffer amplifier 182 amplifies a signal outputted from the oscillator 181 and outputs the amplified signal to the transmission electrode 162.

A battery 183 supplies necessary electric power to the oscillator 181 and the buffer amplifier 182. The ground electrodes of the oscillator 181, the buffer amplifier 182, and the battery 183 are grounded to the ground electrode 163.

Figure 10:
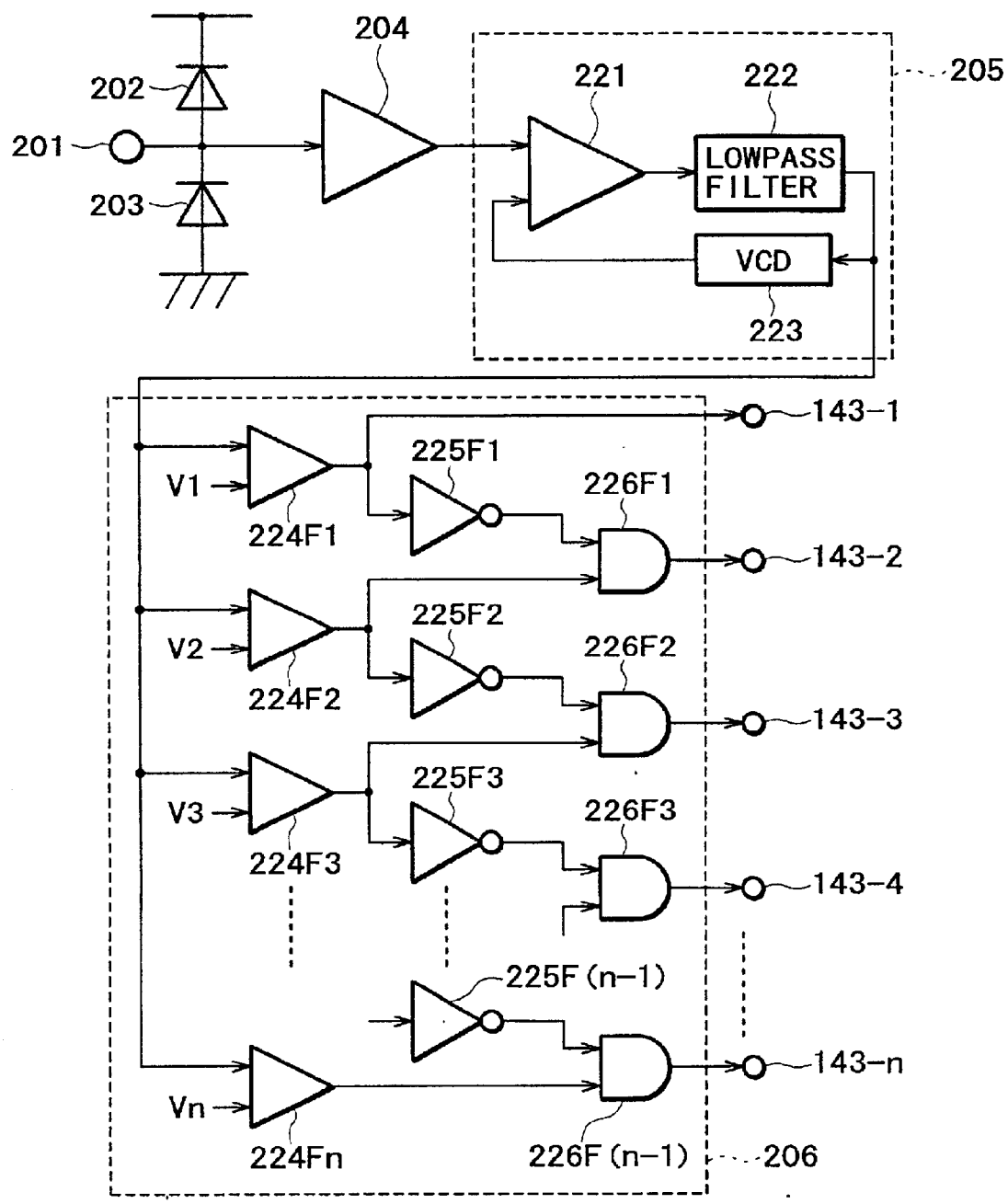
FIG. 10 shows an example of construction of inside of a tuning circuit type detecting unit 142 of FIG. 8.

FIG. 10 shows an example of construction of inside of the tuning circuit type detecting unit 142. An input terminal 201 connected to the input device 2 is connected to a high input impedance amplifier 204. Protection elements 202 and 203 are connected to the input terminal 201 for protection against static electricity.

An output of the high input impedance amplifier 204 is supplied to a phase-comparator 221 of a PPL (phase locked loop) circuit 205. The phase of output of the amplifier 204 and the phase of VCO (voltage controlled oscillator) 223 are compared by the phase-comparator 221. A low-pass filter 222 of the PLL circuit 205 smoothes the output of the phase-comparator 221. The smoothed output is supplied to an input terminal of one of comparators 224F1 to 224Fn of the VCO 223 and a frequency identification unit 206. The other input terminal of the comparator 224F1 to 224Fn receives mutually different reference voltages V1 to Vn.

Here, the reference voltages V1 to Vn satisfy following equation.

$$Vcc(source\ voltage) > V1 > V2 > \ldots > Vn > 0$$

The reference voltages V1 to Vn are set so that frequency of signal transmitted by the transmitter 141 can be identified.

An output of the comparator 224F1 is supplied to an f1 output terminal 143-1 and an inverter 225F1. An output of the comparator 224F2 is supplied to an AND circuit 226F1 and an inverter 225F1. Likewise, outputs of comparators 224F3 to 224F(n-1), each is supplied to the AND circuits 226f to 226f(n-2) and the inverters 225F3 to 225F(n-1). Further, an output of the comparator 224Fn is supplied to the AND circuit 226F(n-1).

The AND circuits 226F1 to 226F(n-1), each supplies a logic product of the outputs of the inverters 225F1 to 225F(n-1) and the outputs of the comparators 224F2 to 224FN, to output terminals 143-2 to 143-n.

Following will be explained about the operation. The user (human body 1) touches the linear electrode 21X1 of the input device 2 with a finger of an arm 1A on which the transmitter 141 is worn. Then, the output of the oscillator 181 of the transmitter 141 is amplified by the buffer amplifier 182 and outputted the amplified one from the transmission electrode 162. The signal outputted from the transmission electrode 162 is transmitted to the input device 2 by way of the arm 1A. An inducing voltage of the transmitted signal is induced to the linear electrode 21X1. This inducing voltage is supplied to the tuning circuit type detecting unit 142.

In the tuning circuit type detecting unit 142, the inducing voltage inputted from the input terminal 201 is amplified by the high input impedance amplifier 204 and supplied to the amplified inducing voltage for the phase-comparator 221 of the PLL circuit 205. The phase-comparator 221 compares a phase of output of the VCO 223 with a phase of output of the high input impedance amplifier 204 to output a result of the comparison (a signal corresponding to a phase error) to the low-pass filter 222. The low-pass filter 222 smoothes the output of the phase comparator 221 and supplies the smoothed output to the VCO 223. The VCO 223 is oscillated with a frequency corresponding to the supplied voltage and outputs the oscillated signal to the phase comparator 221.

Thus, the output of the VCO 223 is tuned to the output of the high input impedance amplifier 204. The output of the low-pass filter 222 becomes a voltage corresponding to frequency of the output signal of the high input impedance amplifier 204. ,Then, the output of the low-pass filter 222 is supplied to the comparators 224F1 to 224Fn in the frequency identification unit 206. The frequency identification unit 206 identifies a frequency of the induced frequency generated in the input device 2 by comparing this output of the low-pass filter 222 with the reference voltages V1 to Vn.

For example, it is assumed that the output voltage VP of the low-pass filter 222 satisfies following equation.

$$V2 > VP > V3$$

Then, the output input VP of the low-pass filter 222 is greater than the reference voltage V3, so that the outputted signal of each of the comparators 222F3 to 222Fn becomes "H" and the output signal of each of the comparators 222F1 to 222F2 becomes "1". The output of the comparator 224F2 is inverted by the inverter 225F2. As a result, the AND circuit 226F2 to which the "H" signal is supplied to two input portions, supplies the "H" signal for the f3 output terminal 143-3.

On the other hand, the output of the comparator 224F1 as it stands is supplied to the f1 output terminal 143-1, so that the output thereof becomes "1" signal. Further, "1" signal of the comparator 224F2 is supplied to the AND circuit 226F1, so that the "1" signal is supplied to the f2 output terminal 143-2.

Further, "H" signals outputted from the comparators 224F3 to 224F(n-1) are respectively inverted by the inverters 225F3 to 225F(n-1) to become "1" signal that is supplied to the AND circuits 226 F3 to 226F(n-1). The AND circuits 226 F3 to 226F(n1) output "1" signal for the output terminals 143-4 to 143-N.

Thus, the frequencies of the inducing voltage detected by the input device are identified that will be outputted to the output terminals different by each of the frequencies.

When a plurality of users touch the input device 2 and a plurality of frequencies of the inducing voltage detected by the input device 2 (i.e. the frequencies are ones of signal transmitted by the transmission unit), an output of the PLL circuit 205 is changed, and an output voltage corresponding to each of frequencies based on the changed output is outputted. As above-mentioned, the output voltage of the PLL circuit 205 is compared with each of the reference voltages V1 to Vn, logically operated, and outputted to the output terminals 143-1 to 143-n. Then, "H" signal is outputted to an output terminal corresponding to the frequency of the inducing voltage detected by the input device 2.

Thus, the transmitter 141 as above is used in place of the signal generator 404 of FIG. 4, and the tuning circuit type detecting unit 142 as above is used in place of the X signal detecting unit 31 and the Y signal detecting unit 32, so that a plurality of users can be identified by each of the chairs on which each of the users sits.

Figure 11:
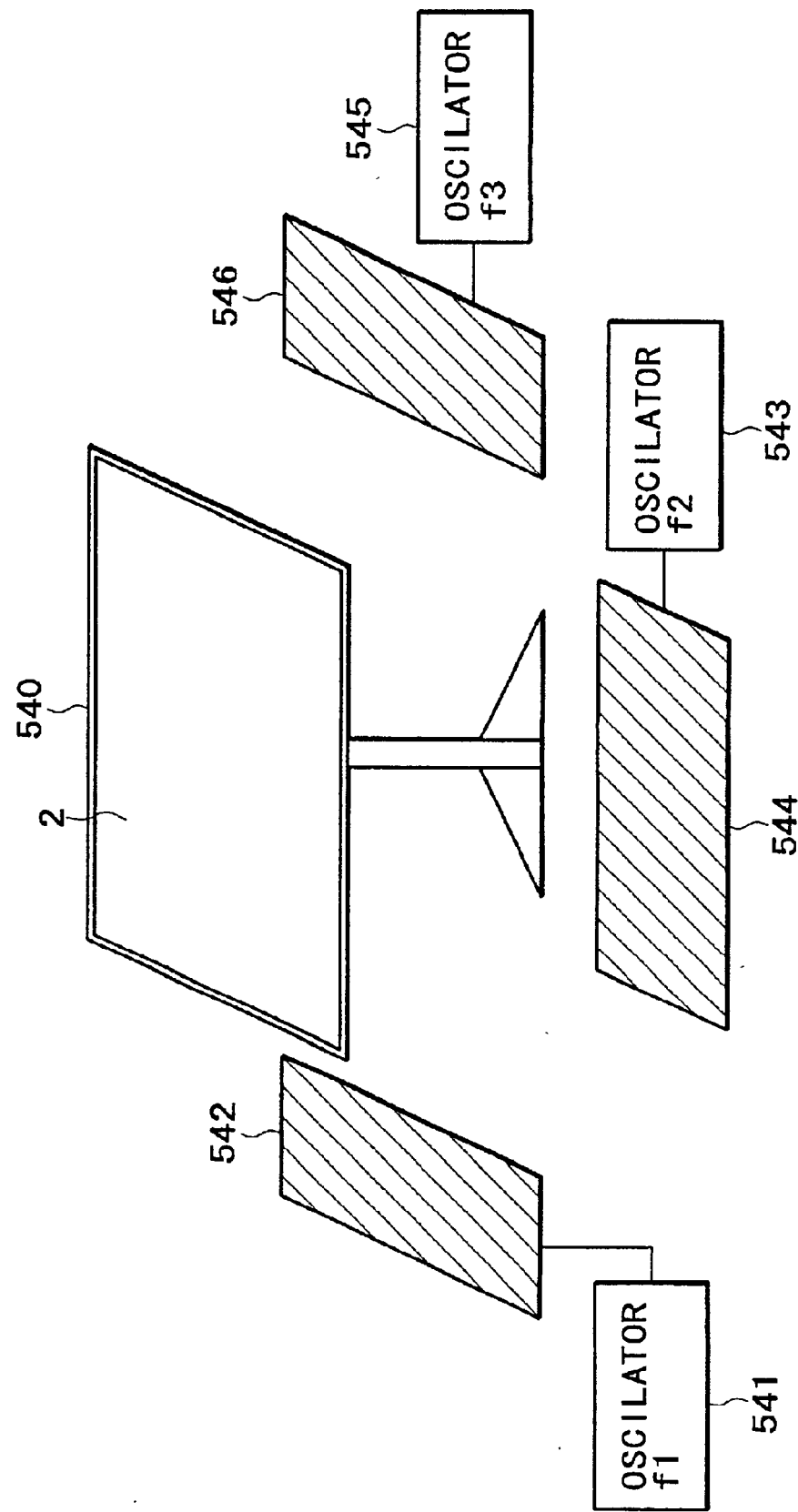
FIG. 11 shows the other further construction of an information transmitting system to which the present invention is applied.

FIG. 11 shows an example of the other construction of the information transmitting system to which the present invention is applied. Oscillators 541, 543, and 545 generate frequencies f1, f2, and f3 being mutually different.

Electrodes 542, 544, and 546 are provided on a floor, each of which transmits a signal supplied from oscillators 541, 543, and 545. The input device 2 (not shown in the figure) is provided on atop surface of a table 540. The tuning circuit type detecting unit 142 is provided at the inside. A coordinate indicated by a finger of a user is detected, so that the user can be identified thereby.

Following will be explained about the operation. The user stands on the electrode 542, and touches or closely approaches the top surface of the table 540. Then, a signal of the frequency fi generated by the oscillator 541 is transmitted (induced) to the user by way of the electrode 542 and further induced to the input device 2 provided on the top surface of the table 540. The tuning circuit type detecting unit 483 detects an inducing voltage generated in the input device 2 and calculates a coordinate on the top surface that the user touches or closely approaches with the finger. Further, the detecting unit 483 identifies that a frequency of the transmitted signal is f1.

Thus, it can be identified that the user who touches and approaches the top surface of the table 540 exists on the electrode 542.

Likewise, when the user stands on the electrode 544, the tuning circuit type detecting unit 142 identifies the frequency f2 of signal generated by the oscillator 543. Further, likewise, when the user stands on the electrode 546, the tuning circuit type detecting unit 142 also identifies the frequency f3 of signal generated by the oscillator 545.

Thus, a place where the user touches with the finger, etc. or closely approaches the top surface of the table 540 can be identified. Further, if a place where the user stands is fixed, identification of the user becomes possible.

In above-mentioned, the number of the oscillator and the number of the electrode, each is three. However, the number thereof is limited thereby. If they can be identified with a frequency of signal generated by the oscillator, any number is available.

Figure 12:
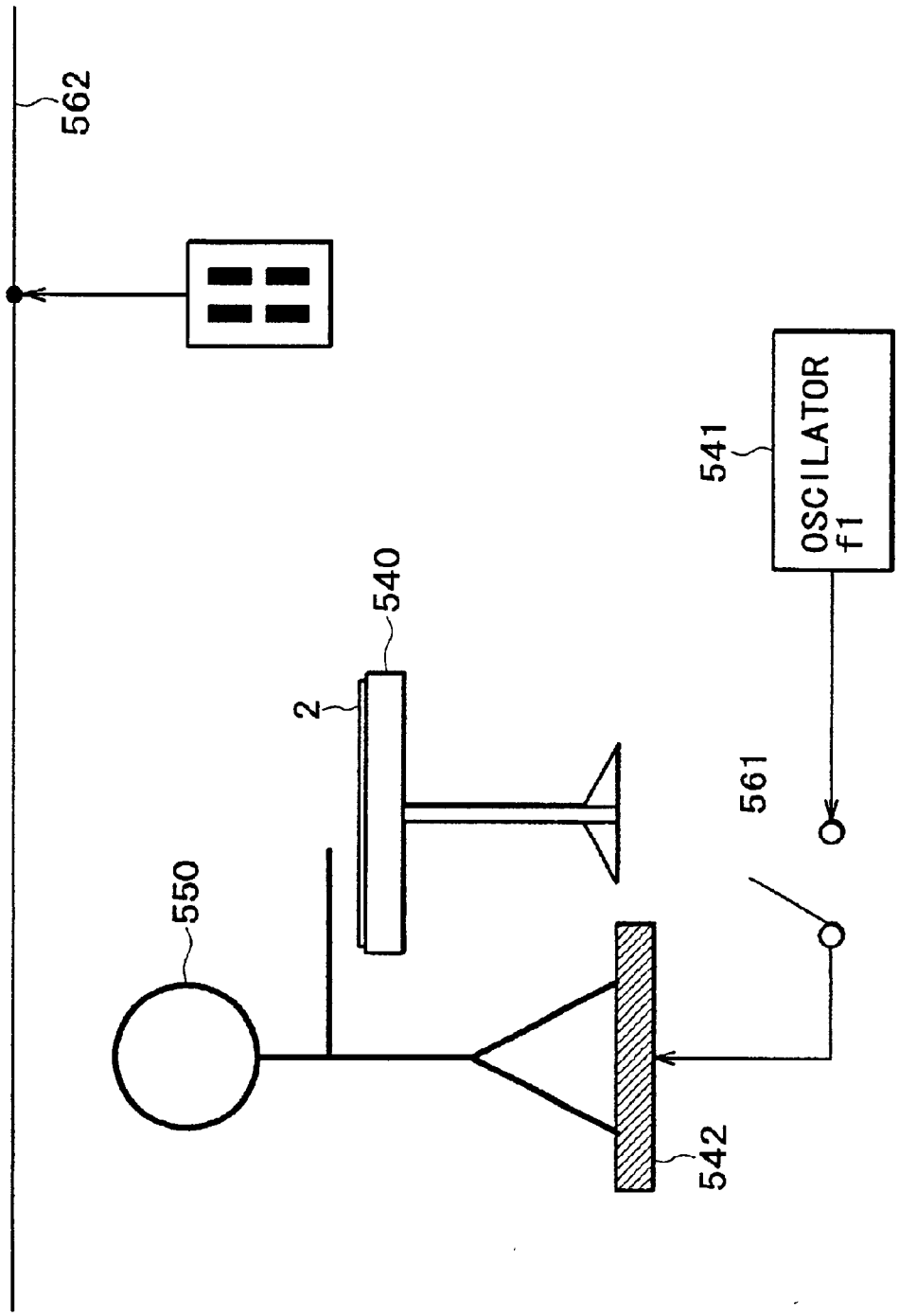
FIG. 12 shows the other further construction of an information transmitting system to which the present invention is applied.

FIG. 12 further shows an example of the other construction. In this example, a switch 561 is provided between the electrode of FIG. 11 (e.g. the electrode 542) and the oscillator (e.g. the oscillator 541). When the switch 561 is ON, a signal transmitted by the oscillator 541 is supplied to the electrode 542 by way of the switch 561. When the user exists on or near the electrode 542, a signal of a frequency f1 is transmitted (induced) from the electrode 542 to the human body 550. If a finger or the like of a human body 550 touches or closely approaches the input device 2 provided on the top surface of the table 540, an inducing voltage is generated in the input device 2 with a signal transmitted by way of the human body 550. The tuning circuit type detecting unit 142 provided at inside of the table 540 detects the inducing voltage, calculates a coordinate on the table that the finger of the human body 550 touches or closely approaches, and identifies the frequency f1.

On the other hand, the switch 561 is OFF, such induction is not performed with a signal of the frequency f1. In the other hand, induction using an indoor commercial electric wiring 562 is performed for the input device 2 provided on the table 540 by way of the human body 550 and the induction action is detected by the tuning circuit type detecting unit 142. In this case, the tuning circuit type detecting unit 142 of the table 540 detects a commercial frequency.

Thus, even if the user does not exist on or near the electrode 542, the user can perform detection action of induction to the input device 2 provided on the top surface of the table 540.

Further, if the frequency f1 of signal to be transmitted by the oscillator 541 is set so as to be different from a commercial frequency, the user can judge as to whether or not the user exists on or near the electrode 542. In abovementioned, the number of the electrode 542 that transmits a signal to the human body 550, the switch 561, and the oscillator 541, each, is single. However, the number is not limited to this number. A plurality of electrodes, switches, and oscillators are available.

Figure 13:
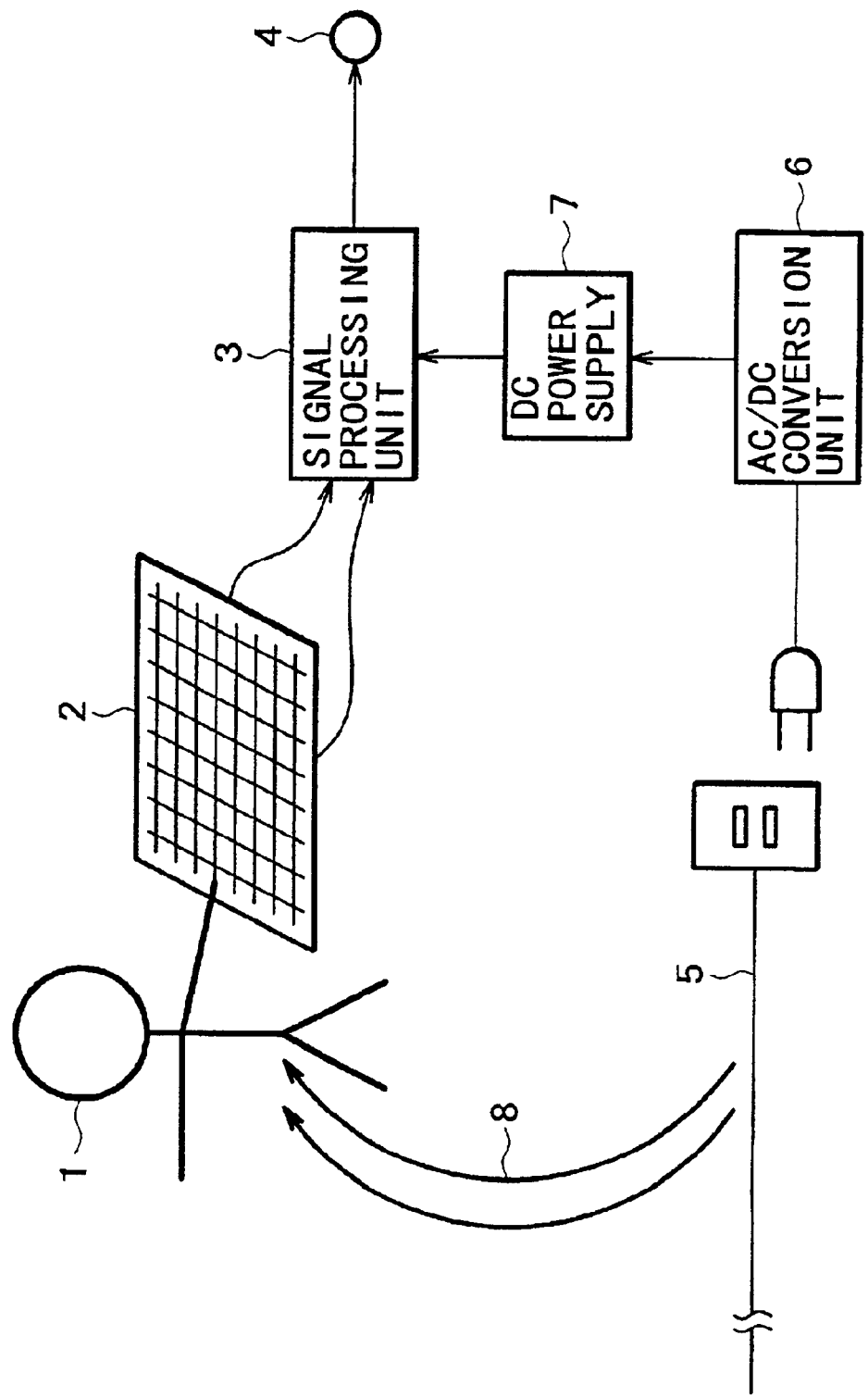
FIG. 13 shows the other further construction of an information inputting system to which the present invention is applied.

FIG. 13 shows an example of the other construction of the information processing apparatus to which the present invention is applied. In this example, the human body 1 can touch the input device 2 having a linear electrode array arranged in an X direction and a Y direction that are mutually isolated. A signal processing unit 3 is connected to the input device 2, detects an inducing voltage generated in the input device 2, processes the inducing voltage, and outputs the processed one to an output terminal 4. An AC/DC (alternating current/direct current) conversion unit 6 converts an AC voltage supplied from an indoor commercial power supply wiring 5 and outputs the converted one to a DC power supply 7. The DC power supply 7 has a DC voltage supplied from the AC/DC conversion unit 6 stabilized and supplies the stabilized DC voltage to the signal processor 3.

In a place where the indoor commercial power supply wiring 5 is installed, such as an office, a home, and a school, induction 8 owing to the commercial power supply appears in the human body 1.

Figure 14:
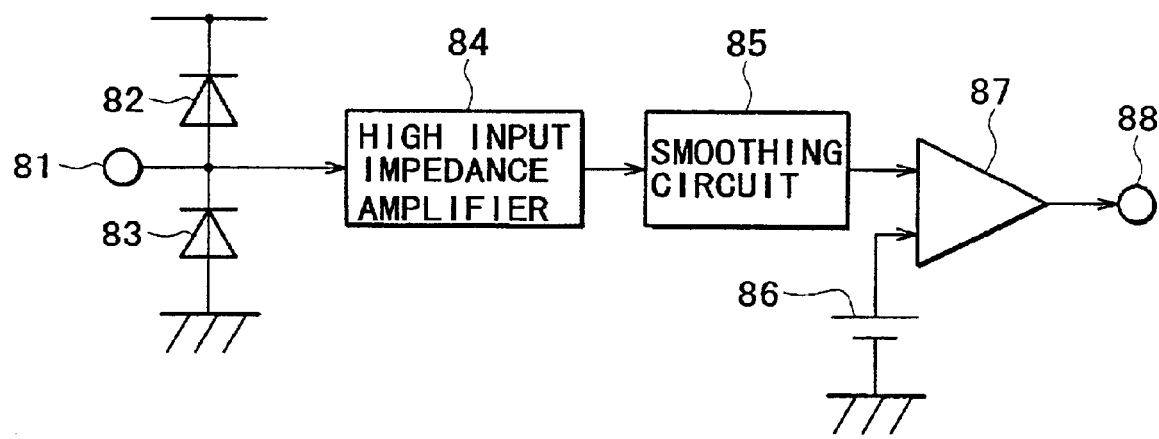
FIG. 14 shows an example of construction of a detecting unit in which a smoothing circuit 85 is used that smoothes a detection signal.

FIG. 14 shows an example of construction of a detecting unit in which a smoothing circuit smoothes a detection signal. An inducing voltage is supplied to a high input impedance amplifier 84 by way of the electrode 81 connected to a linear electrode of the input device 2. Protection elements 82 and 83 are connected to an electrode 81 for protection against electrostatics. An output signal of the high impedance amplifier 84 is smoothed by a smoothing circuit 85 and supplies a smoothed signal to a comparator 87. The comparator 87 compares an output voltage of the smoothing circuit 85 with a reference voltage outputted from a reference voltage generating unit 86 and outputs the comparison result to an output terminal 88.

In this example, when the human body 1 touches the linear electrode of the input device 2, the smoothing circuit 85 smoothes an inducing voltage, so that generation such as chattering is refrained.

Figure 15:
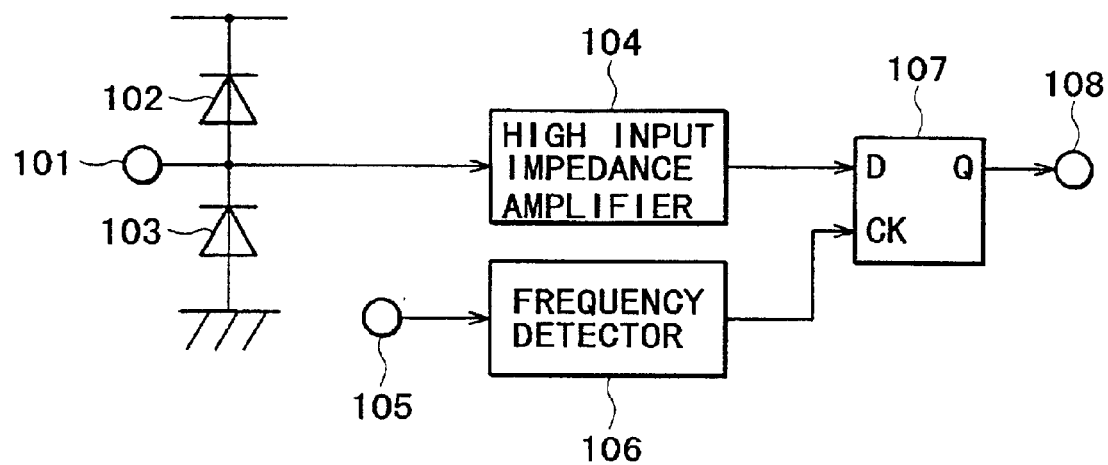
FIG. 15 shows the other example of construction of the detecting unit.

FIG. 15 shows an example of the other construction of the detecting unit. An inducing voltage generated in a linear electrode in the input device 2 is supplied to a high input impedance amplifier 104 by way of an electrode 101. Protection elements 102 and 103 are connected to an electrode 101 for protection against static electric. A signal amplified by the high input impedance amplifier 104 is supplied to a data terminal of D-type flip-flop circuit 107.

The frequency of a commercial power supply voltage inputted by an input terminal 105 connected to the commercial power supply in a same manner as the induced power supply can be detected by a frequency detection circuit 106. The frequency detection circuit 106 outputs a clock signal synchronized to the detected frequency to a clock terminal of the D-type flip-flop circuit 107. The D-type flip-flop circuit 107 is synchronized to a clock signal outputted from the frequency detection circuit 106, latches a signal supplied from the high input impedance amplifier 104, and outputs the latched signal to an output terminal 108. Also in this case, when the human body 1 touches the linear electrode of the input device 2, the inducing voltage is latched by the D-type Flip-flop circuit 107, so that erroneous detection of the inducing voltage owing to a noise (an inducing voltage having a component of frequency except for a commercial alternating current power supply frequency) can be prevented.

Figure 16:
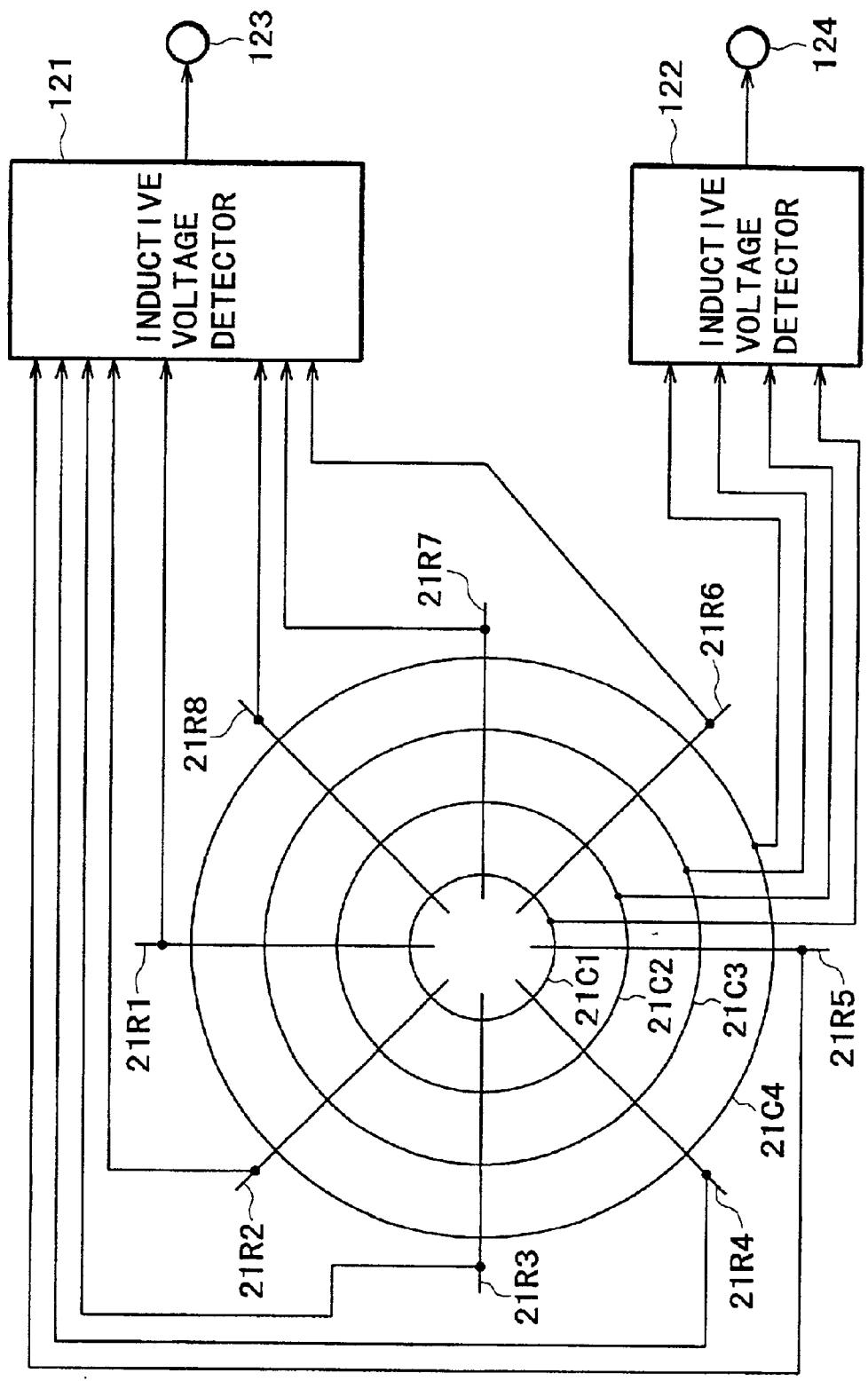
FIG. 16 shows the other example of construction of the input device 2 of FIG. 4.

FIG. 16 is a view of an example of the other construction of the input device 2. The input device 2 is constructed by linear electrodes 21Ri (i=1, 2, . . . , 8) arranged in a radial manner and linear electrodes 21Ci (Ii=1, 2, 3, 4) in a concentric manner. In this example, the number of the linear electrodes 21Ri in a radical manner is eight. The number of the linear electrode 21Ci in a concentric manner is four. The linear electrodes 21Ri arranged in a radial manner are connected to the induced voltage detection unit 121. The linear electrodes 21Ci arranged in a concentric manner are connected to the induced voltage detection unit 122. The induced voltage detection unit 121 that detects an inducing voltage in the linear electrode 21Ri in a radial manner, outputs the detection result to an output terminal 123. An induced voltage detection unit 122 that detects an inducing voltage in the linear electrode 21Ci in a concentric manner, outputs the detection result to an output terminal 124.

The number of the linear electrodes is not limited thereto. Namely, any number thereof is available. The number thereof is used, corresponding to a minute extend of a detection coordinate dimensioning.

Figure 17:
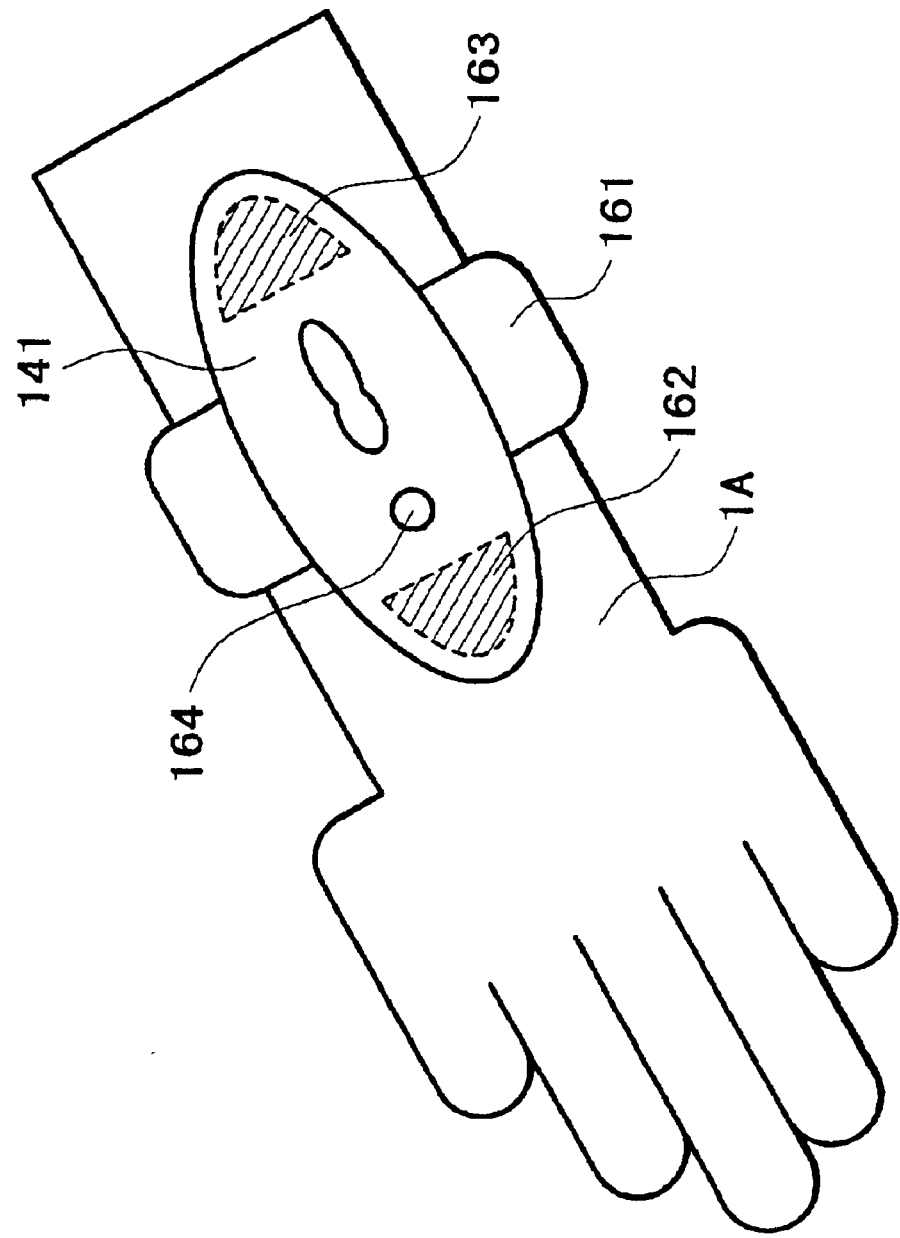
FIG. 17 is an outline view showing an example of construction of the transmitter 141 of FIG. 8.

FIG. 17 is a view of outline of example of construction of a transmitter 141. In this example, the transmitter 141 is worn on an arm 1A of the user (the human body 1) with a band 161. A transmission electrode 162 and a ground electrode 163 are provided on a surface where the transmitter 141 contacts the arm 1A. Further, the transmitter 141 has an LED 64 to be illuminated corresponding to a transmission state.

The transmitter explained in FIG. 9, is used for the transmitter 141 used here. Here, the oscillator 181 is oscillated, generates a signal of a preset and predetermined frequency and outputs the generated signal to the buffer amplifier 182. The oscillator 181 when outputting the signal illuminates the LED 64. The buffer amplifier 182 amplifies the signal output from the oscillator 181 and outputs the amplified signal to the transmission electrode 162. Further, the tuning circuit type detecting unit explained in FIG. 10, can be used for the tuning circuit type detecting unit 142. Therefore, the same explanation of the operation is omitted hereinafter.

Thus, the user (the transmitter 144) can be identified by not only detection of a coordination where the user (human body 1) touches the input device 2 but also usage of a frequency of signal transmitted by the transmitter 144 worn on the user (human body 1), as an induced power supply source in place of a commercial power supply.

Figure 18:
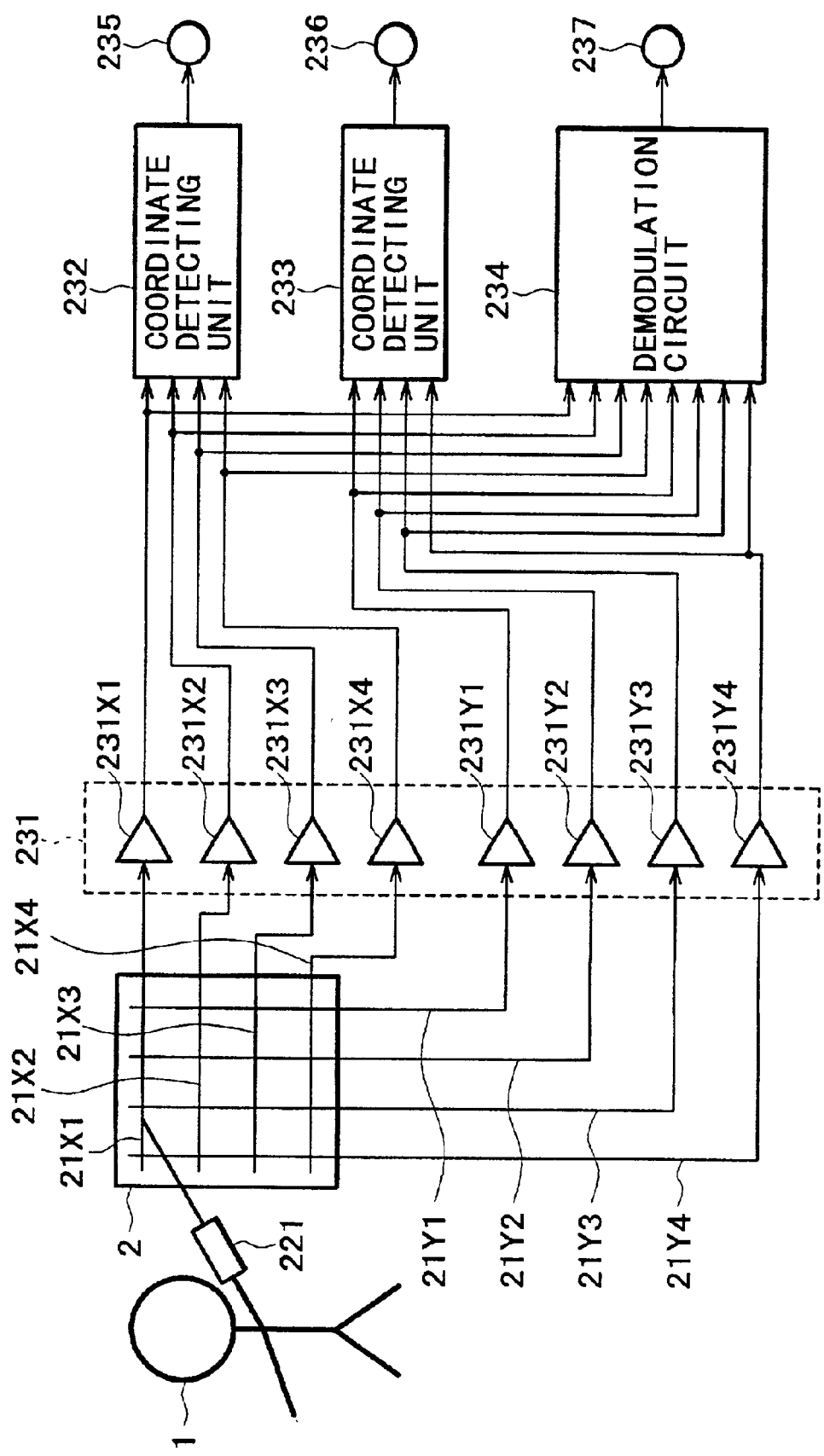
FIG. 18 shows an example of construction in which a transmitter 221 is used which transmits identification information as an inducing voltage source.

FIG. 18 shows an example of construction in which a transmitter is used that transmits identification information as an induced power supply.

A transmitter 221 is worn on the human body 1. The outline of the transmitter 221 is substantially as same as the transmitter 141 of FIG. 17. Therefore, the explanation is omitted. The transmitter 221 transmits an identification information modulated in an FM (frequency modulation) manner to the arm 1A of the human body 1.

An inducing voltage generated in linear electrodes 21Xi to 21Yi in the input device 2, each is supplied to high input impedance amplifiers 231 Xi and 231 Yi (i=1, 2, 3, 4) in an amplifier section 231. The high input impedance amplifier 231 Xi in the amplifier section 231 amplifies the supplied inducing voltage and supplies the amplified voltage to a coordinate detecting unit 232 and a modulation circuit 234. Likewise, the high input impedance amplifier 231Yi in the amplifier section 231 amplifies the supplied inducing voltage and supplies the amplified inducing voltage to a coordinate detecting unit 233 and the modulation circuit 234.

The coordinate detecting units 232 and 233 detect coordinates (value of "i") from input signals and respectively output the detected signals to output terminals 235 and 236. The modulation circuit 234 modulates the input signals, obtains information included in the input signals, and output the obtained information to the output terminal 237.

Figure 19:
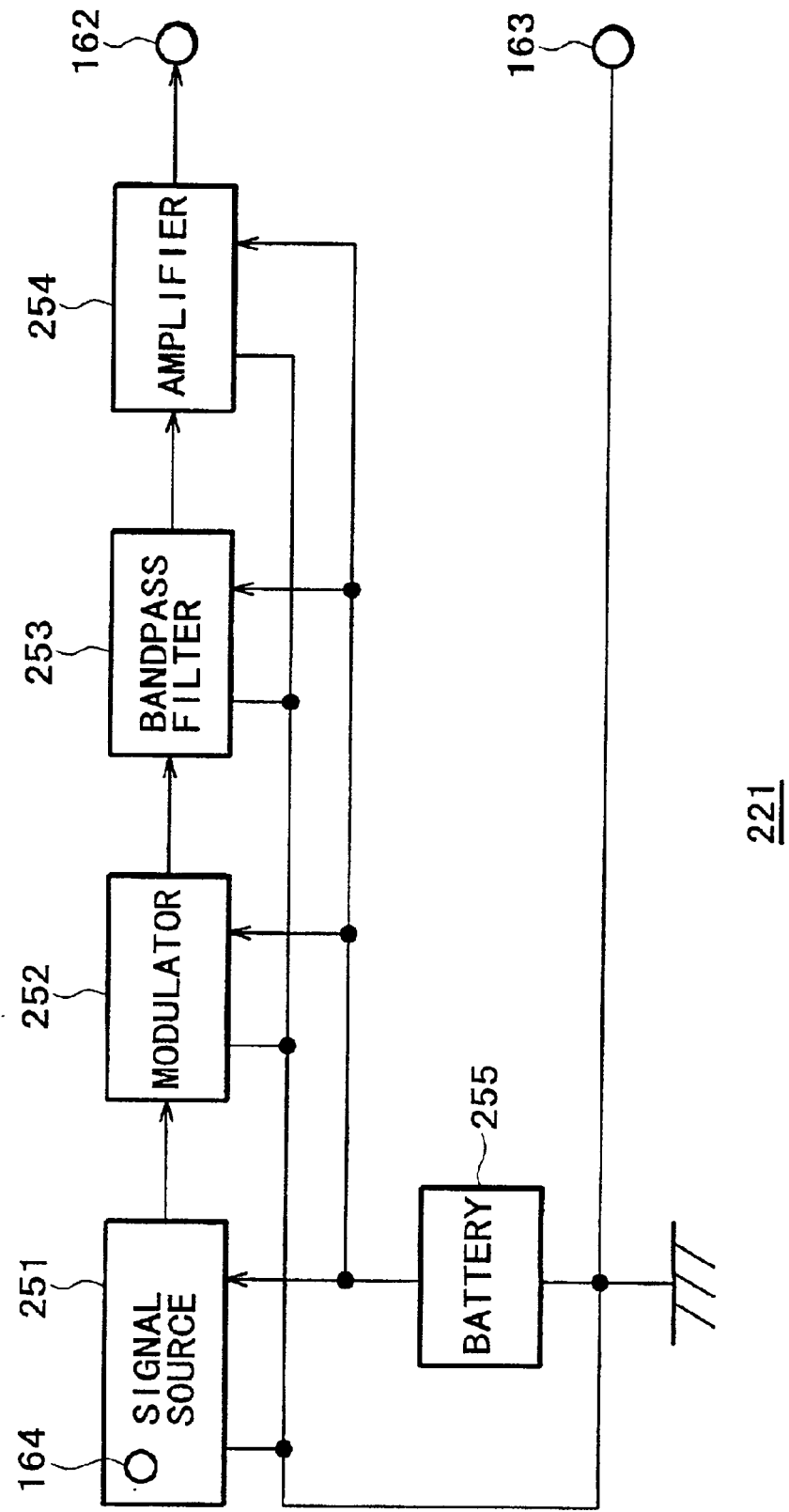
FIG. 19 shows an example of construction of inside of a transmitter 221 of FIG. 18.

FIG. 19 shows an example of construction of inside of the transmitter 221. A signal source 251 is constructed by e.g. a microcomputer and generates a signal to be outputted to the input device 2. For example, this signal can be regarded as an identification signal for identifying the transmitter 221 (user who has the transmitter 221). The signal source 251 has an LED 164 illuminated when outputting a signal.

For example, a modulator 252 modulates a carrier wave of a predetermined frequency in an FM system manner based on the signal that is the identification information inputted from the signal source 251. A band-pass filter 253 samples a component of signal existing in a frequency band to be transmitted from among signals outputted from the modulator 252 and outputs the sampled signal corresponding to the component to the amplifier 254. An amplifier 254 amplifies the inputted signal and outputs the amplified signal to a transmission electrode 162.

One end of a battery 255 is grounded. From the other end thereof, necessary electric power is supplied to the signal source 251, the modulator 252, the band-pass filter 253, and the amplifier 254. A ground electrode 163 is connected to ground points of the signal source 251, the modulator 252, the band-pass filter 253, the amplifier 254, and the battery 255.

Figure 20:
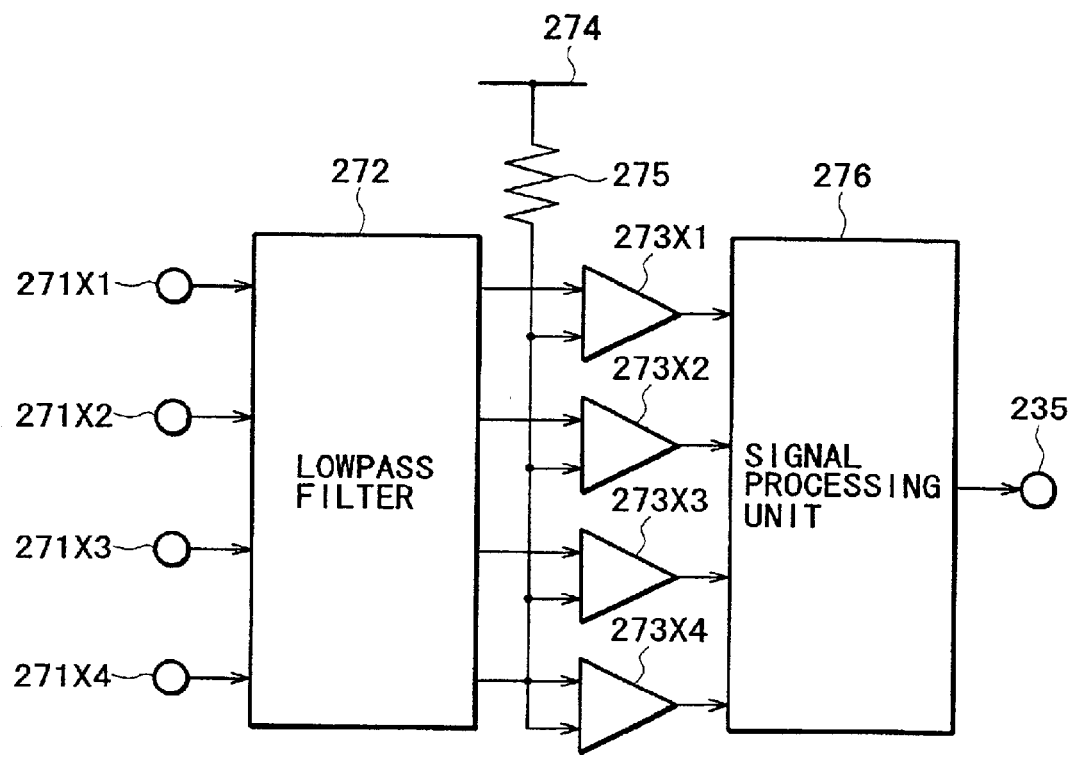
FIG. 20 shows an example of construction of a coordinate detecting unit 232 of FIG. 18.

FIG. 20 shows an example of construction of the coordinate detecting unit 232 of FIG. 18.

Input terminals 27Xi (i=1, 2, 3, 4) are connected to high impedance amplifiers 231Xi (i=1, 2, 3, 4) of the amplifier section 231 of FIG. 18. A low-pass filter 272 obtains output signals of the high input impedance amplifier 231Xi by way of the input if terminals 271Xi, smoothes the obtained output signals, and outputs each of the smoothed signals to one of inputs of comparators 273 Xi (i=1, 2, 3, 4). A reference power supply source 274 is connected to the other one of inputs of the comparator 273Xi by way of a resistor 275, so that a predetermined reference voltage is supplied thereto.

A predetermined voltage to be supplied to the comparator 273Xi from the reference voltage source 274 by way of the resistor 275 is set such that the comparator 273Xi makes the outputs of low-pass filter 272 into binary values (e.g. ½ of the power supply voltage). The comparator 273Xi compares the predetermined reference voltage with the output voltage of the low-pass filter 272 and outputs the compared result, thereby making the outputs of low-pass filter 272 into digital data and supplying the digitalized data to a signal processor 276.

The signal processor 276 latches the signal supplied from each of the comparators 273Xi and detects a coordinate there-from. The detected coordinate is outputted from an output terminal 235 to e.g. a personal computer (not shown) or the like.

The construction of the coordinate detecting unit 233 is substantially as same as that of the coordinate detecting unit 232 of FIG. 20.

Figure 21:
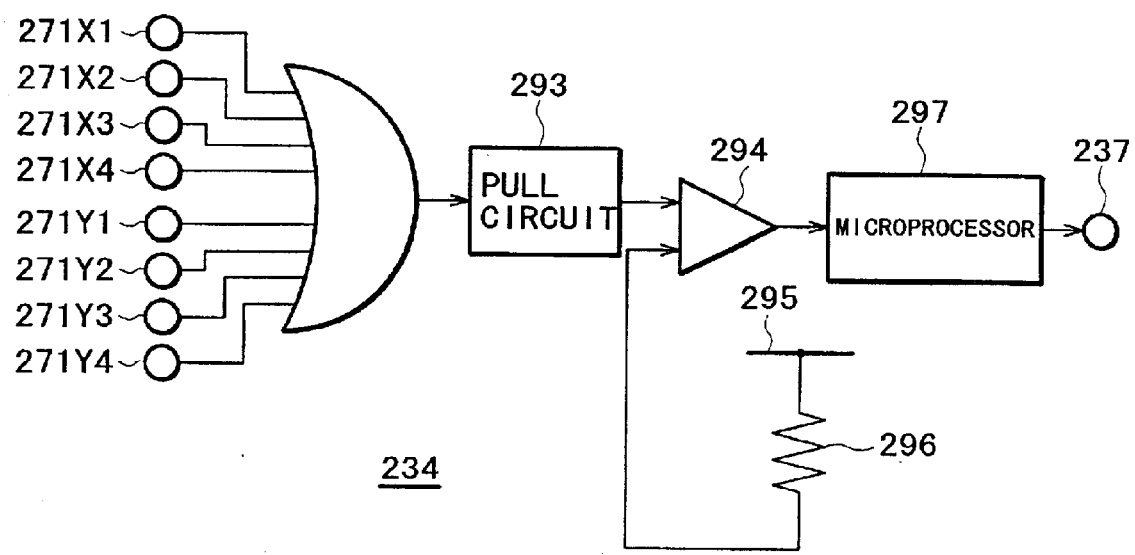
FIG. 21 shows an example of construction of a demodulation circuit 234 of FIG. 18.

FIG. 21 shows an example of construction of the modulator 234 of FIG. 18.

Input terminals 291Xi and 291Yi (i=1, 2, 3, 4) are respectively connected to the high input impedance amplifiers 231Xi and 231Yi in the amplification section 231 of FIG. 18. The output signals of the high input impedance amplifiers 231Xi and 231Yi are supplied to an OR circuit 292.

The OR circuit 292 calculates a logical add of the signals supplied from the input terminals 291Xi and 291Yi and supplies the calculated result to a PLL circuit 293. The PLL circuit 293 demodulates the supplied signal from the OR circuit 292 and outputs the demodulated signal to one of the inputs of a comparator 294. The other input of the comparator 294 is connected to a reference voltage source 295 by way of a resistor 296, to which a predetermined reference voltage is supplied.

A predetermined reference voltage to be supplied to the comparator 294 from the reference voltage source 295 by way of a resistor 296 is set by a value such that the comparator 294 makes an output of the PLL circuit 293 into a binary value (e.g. ½ of the power supply voltage). The comparator 294 compares the predetermined reference value with the demodulated output of the PLL circuit 293 and outputs the compared result, thereby making the output from the demodulated PLL circuit 293 into a digital data and supplying the digital data to a microprocessor 297.

The microprocessor 297 analyzes the supplied digital data, applying error correction processing to the digital data, and outputs the demodulated signal from the output terminal 237 to a personal computer or the like.

Following will be explained about the operation. The signal source 251 of the transmitter 221 outputs previously stored identification information to the modulator 252. The modulator 252 modulates the identification information inputted from the signal source 252 in an FM modulation manner and outputs the FM-modulated information to the band-pass filter 253. The band-pass filter 253 samples only necessary component in a frequency band and outputs the sampled component to the amplifier 254. The amplifier 254 amplifies the input signal and outputs the amplified signal from the transmission electrode 162.

When the human body 1 touches e.g. the linear electrode 21X1 from among the linear electrodes in the input device 2, an inducing voltage of signal transmitted from the transmitter 221 by way of the arm 1A of the human body 1 (refer to FIG. 17) is generated in the linear electrode 21X1. When an inducing voltage is generated at the linear electrode X1, the inducing voltage is supplied to the high input impedance amplifier 231X1 in the amplifier section 231. The input impedance amplifier 231X1 amplifies the inducing voltage of signal transmitted by the transmitter 221 and supplies the amplified voltage to the low-pass filter 272 by way of the input terminal X1 of the coordinate detecting unit 232. Further, the high input impedance amplifier 231X1 supplies the amplified output signal to the OR circuit 292 by the input terminal 291X1.

The low-pass filter 272 of the coordinate detecting unit 232 smoothes the input signal by the high impedance amplifier X1 byway of the input terminal X1 and outputs the smoothed signal to the comparator 273X1. The comparator 273X1 compares the output of the low-pass filter 272 with a predetermined voltage, thereby making the output into a digital data and supplies the digital data to the signal processor 276. The signal processor 276 latches the digital signal inputted from the comparator Xi. Only comparator or comparators corresponding to an electrode that the human body 1 touches from among the comparators 273Xi, outputs a signal being different from a signal outputted from the other comparator. Therefore, then, a linear electrode that the human body 1 touches can be identified and a coordinate Ii in Y-axis can be detected. The coordinate detecting unit 233 using a principle like this can detect an X coordinate.

On the other hand, the OR circuit 292 in the demodulation circuit 234 to which the outputted signal is supplied from the high input impedance amplifier 231Xi in the amplifier section 231 by way of the input terminal 291 Xi calculates a logic add of the inputted signals and outputs the calculated one to the PLL circuit 293. The PLL circuit 293 demodulates the outputted m signal of the OR circuit 292, samples an identification signal transmitted by the transmitter 221, and outputs the sampled signal to the comparator 294. The comparator 294 compares the output signal of the PLL circuit 293 with a predetermined reference voltage, makes the output signal into digital data, and outputs the digital data to the microprocessor 297. The microprocessor 297 analyzes the input digital signal and demodulates the identification information. The identification signal is outputted from the output terminal 237 to a personal computer or the like.

Thus, the user (the transmitter 221) can be identified not only by detection of coordination of input device 2 that the user touches but also by usage of the identification signal transmitted by the transmitter 221 worn on the arm 1A.

In the above-mentioned, it is explained that the identification signal to be transmitted by the transmitter 221 is modulated in an FM manner. However, the modulation is not limited to the FM manner. Also when modulated in an ASK (amplitude shift keying) manner, the detection of a coordinate and the identification of the transmitter can be performed in a system like the systems shown in FIGS. 18 to 20.

Figure 22:
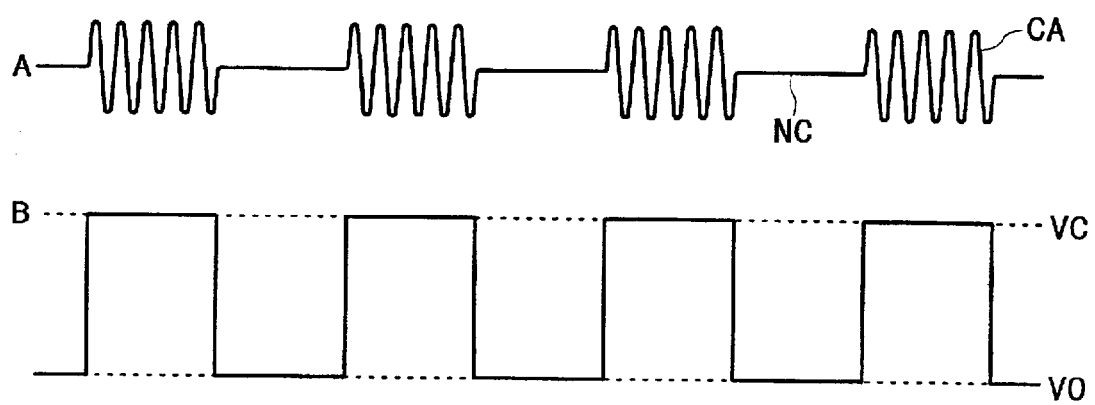
FIG. 22 shows a waveform of operation of a PLL circuit 293 of FIG. 21.

FIGS. 22A and 22B show a waveform of operation of the PLL circuit 293 in this case. FIG. 22A shows a signal in which an identification information to be outputted from the signal source 251 of the transmitter 221 is modulated in the ASK manner. When the identification information is ASK-modulated, the waveform is constructed by a portion CA where a carrier wave exists and a portion NC where a carrier wave does not exist.

When inputting the signal of the waveform shown in FIG. 22A to the PLL circuit 293, then in the CA portion where the carrier wave exists, the output voltage of the PLL circuit 293 becomes a voltage VC whereby a VCO (not shown in the figure) of inside of the PLL circuit 293 outputs a signal, tuning to the carrier wave. On the other hand, in the NC portion where the carrier wave does not exist, the output voltage of the PLL circuit 293 becomes the voltage VO whereby the VCO of inside of the PLL circuit 293 is self-oscillated (refer to FIG. 22B).

In the above-mentioned, the PLL circuit 293 demodulates the ASK-modulated signal and samples the identification information of the transmitter 221.

Further, in the above-mentioned system, for example, a plurality of transmitters that output different pieces of identification information are worn on both right and left arms of the human body 1, so that any of the right and the left arms can be identified. In this case, an output of the transmitter is on purpose refrained, so that an inducing voltage by the output from the transmitter worn on the arm that touches to the input device 2, becomes dominant therein.

Figure 23:
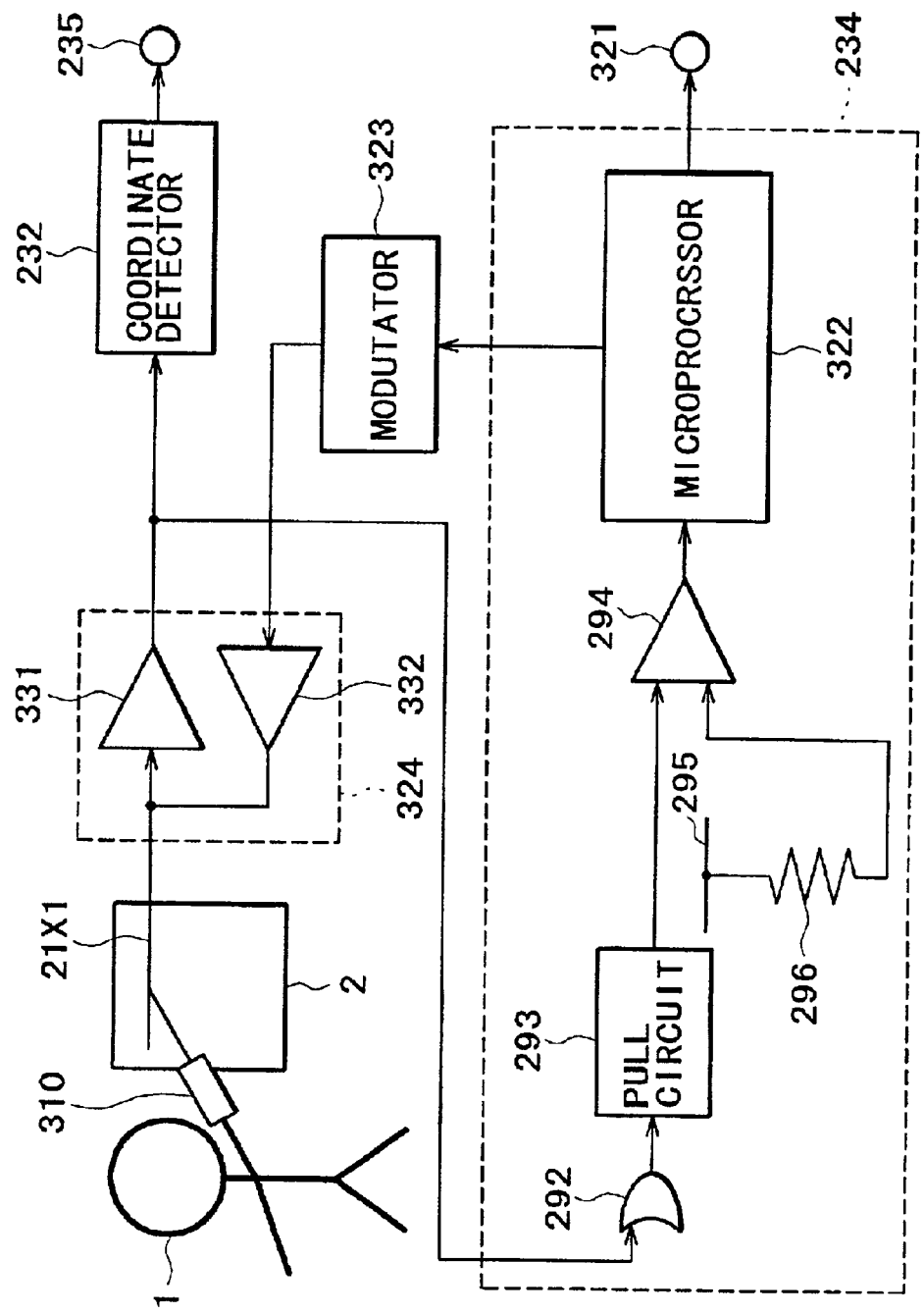
FIG. 23 shows a construction in which a communicating device 310 is used as the inducing voltage source.

FIG. 23 shows an example of construction in which a transmitter can perform both transmission and reception. In is noted that a construction of system connected to the other linear electrodes 21X2 to 21X4 and 21Y1 to 214 of the input device 2 is substantially as same as that of the linear electrode 21X1.

A communication device 310 is worn on the human body 1. An amplifier 324 is connected to a linear electrode 21X1 of the input device 2. A receiving high input impedance amplifier 331 and a transmitting high input impedance amplifier 332 constructs the amplifier 324. The receiving high input impedance amplifier 331 amplifies the inducing voltage generated at the linear electrode 21X1 and supplies the amplified voltage to the coordinate detecting unit 232 and the modulation circuit 234. The coordinate detecting unit 232 detects a coordinate from the supplied signal and outputs the detection coordinate to an output terminal 235. The modulation circuit 234 demodulates the signal supplied from the amplifier section 324 and outputs the demodulated signal to an input and output terminal 321.

The input and output terminal 321 is connected to a personal computer (not shown in the figure), outputs the output signal to the personal computer, obtains a signal transmitted from the personal computer, and supplies the obtained signal to a microprocessor 322 in demodulation circuit 234.

The microprocessor 322 converts the signal obtained by way of the input and output terminal 321 into a predetermined-formatted signal and outputs the formatted signal to a modulator 323. The modulator 323 modulates the inputted signal in an FM manner and outputs the modulated signal to a transmitting high inputting impedance amplifier 332 in the amplifier section 324. The transmitting high input impedance amplifier 332 amplifies the inputted signal and outputs the amplified signal to the linear electrode 21X1 of the input device 2. The signal supplied to the linear electrode X1 is received by the communication device 310 by way of the human body 1.

Figure 24:
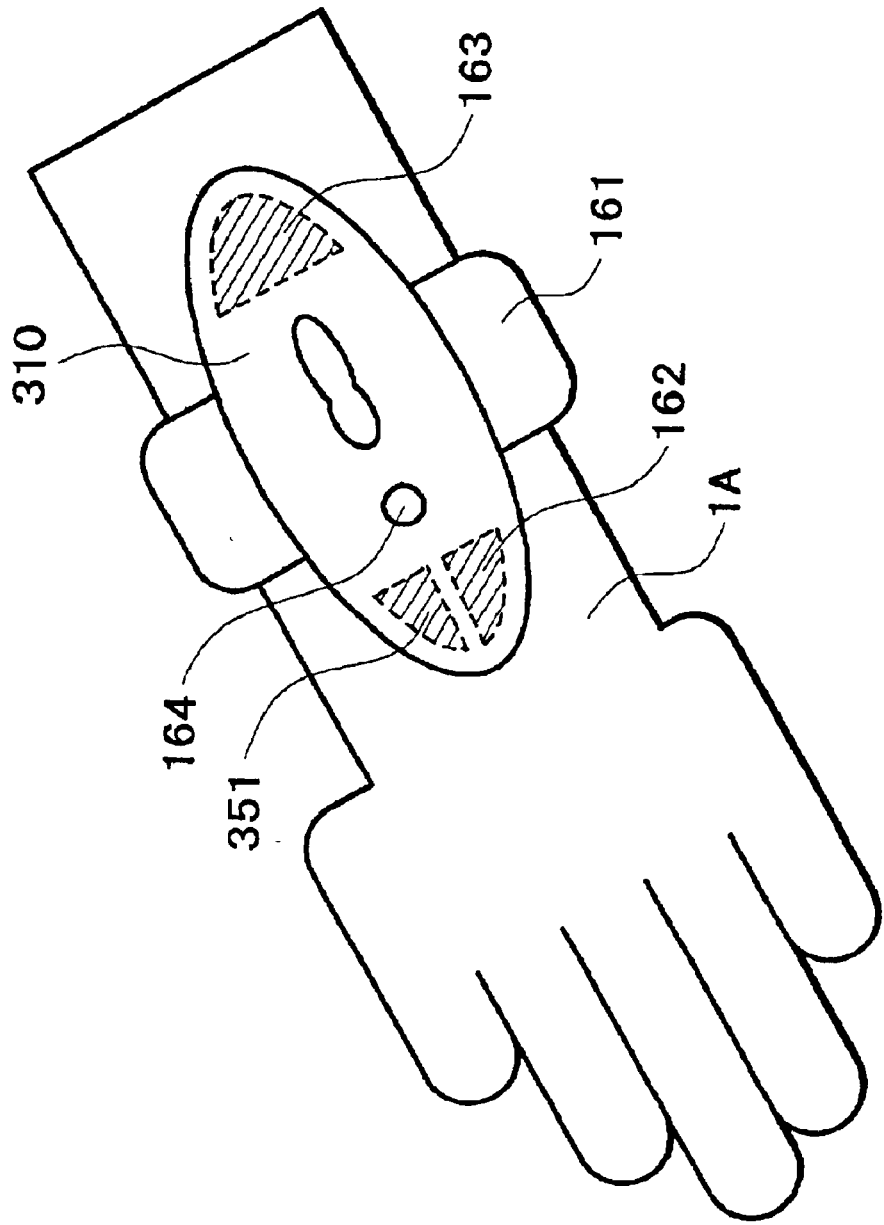
FIG. 24 is an outline view showing an example of construction of the transmitter 310 of FIG. 23.

FIG. 24 shows a view of outline of an example of construction of the communication device 310. In this example, the communication device 310 is worn on the arm 1A of the user (human body 1) using a band 161. The transmission electrode 162, the ground electrode 163, and the reception electrode 351 are provided on a surface where the communication 310 and the arm 1A are touched. Further, the communication device 310 has an LED 164 that is illuminated corresponding to a transmission state of the communication 310.

Figure 25:
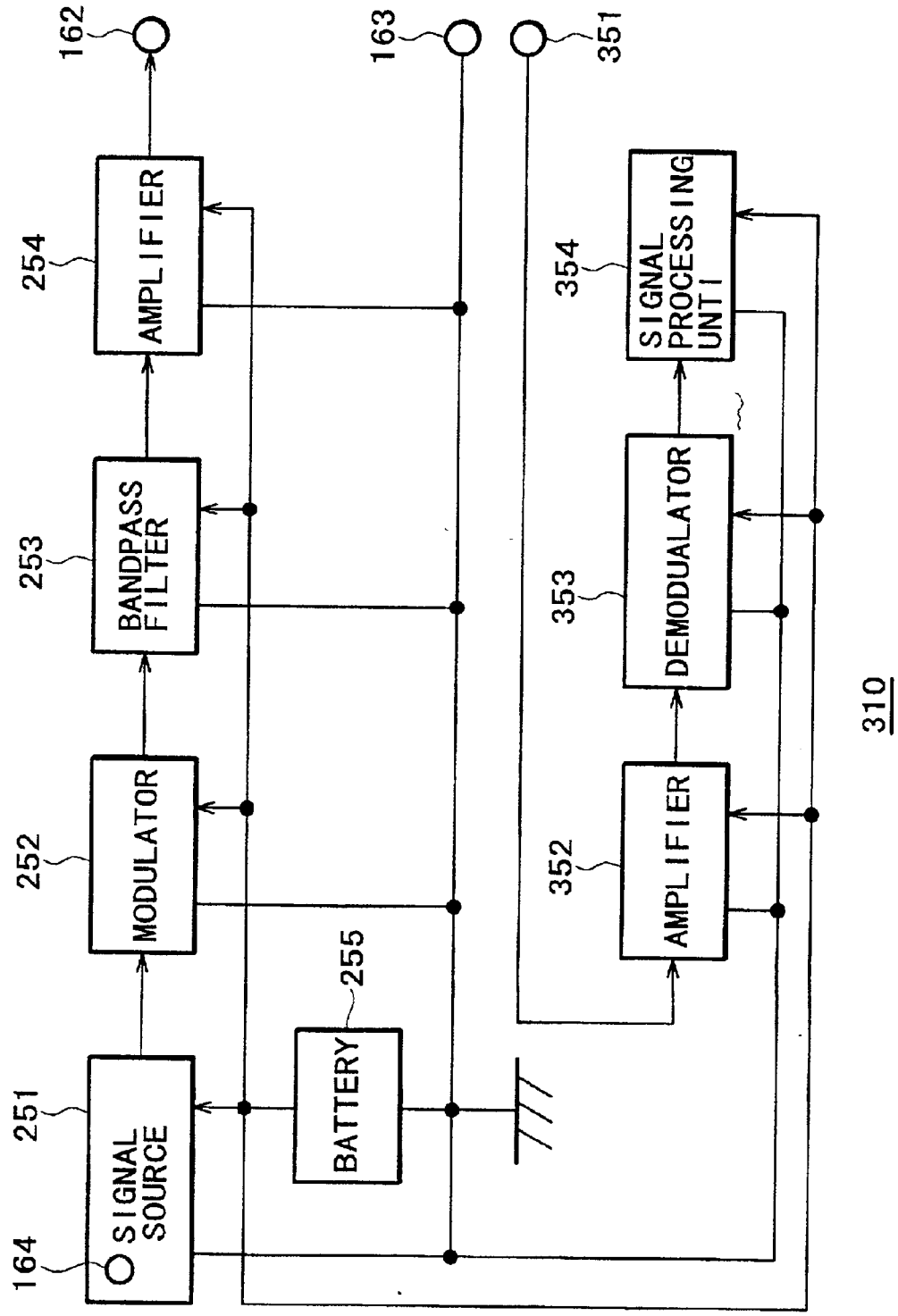
FIG. 25 is a view showing an example of construction of inside of the communicating device 310 of FIG. 23.

FIG. 25 shows an example of construction of inside of the communication device 310. A signal source 251, a modulator 252, a band-pass filter 253, an amplifier 254, a transmission electrode 162, and an LED 164 are substantially as same as those of the transmitter of FIG. 19. Therefore, the explanation is omitted.

A reception electrode 351 outputs a signal received by way of the human body 1 to an amplifier 352. The amplifier 352 amplifies the input signal and outputs the amplified signal to a demodulator 353. The demodulator 353 demodulates the signal supplied from the amplifier 352 and supplies the demodulated signal to a signal processor 354. The signal processor 354 applies a predetermined process to the inputted signal.

One end of a battery 255 is grounded. A required electrical power is supplied to the signal source 251, the modulator 252, the band-pass filter 253, the amplifiers 254 and 352, the demodulator 353, and the signal processor 354 from the other end of the battery 255. A ground electrode 163 is connected to each of the grounds point of the signal source 251, the modulator 252, the band-pass filter 253, the amplifiers 254 and 352, the battery 255, demodulator 353, and the signal processors 354.

Following will be explained about the operation. The operation of transmission of the communication 310 is substantially as same as that of the system of FIG. 18. The explanation is omitted. Namely, the following will be done about an operation of reception.

A signal transmitted by the personal computer is supplied to the microprocessor 322 of the demodulation circuit 234 by way of the input and output terminal 321. The microprocessor 322 converts the inputted signal into a predetermined-formatted signal and outputs the formatted signal to the modulator 323. The modulator modulates the signal inputted from the microprocessor 322 in an FM manner and supplies the modulated signal to the transmitting high input impedance amplifier 332 of the amplifier section 324. The transmitting high input impedance amplifier 332 amplifies a transmission signal modulated by the modulator 323 and outputs the amplified signal to the linear electrode 21X1 of the input device 2.

When the arm 1A of the human body 1 touches the linear electrode 21X1, the reception electrode 351 of the communication device 310 by way of the arm 1A receives the signal outputted from the linear electrode 21X1. The signal received by the reception electrode 351 is supplied to the amplifier 352. The amplifier 352 amplifies the supplied signal and outputs the amplified signal to the demodulator 353. The demodulator 353 demodulates the amplified signal by the amplifier 352 and supplies the modulated signal to the signal processor 354. The signal processor 354 processes the signal inputted from the demodulator 353.

Thus, the transmission and the reception processing is performed, by way of the human body 1, between the ambience-side communication device whose transmission and reception terminal is the input device 2 and the communication device 310 regarded as a wearable communication device worn on the human body 1.

Figure 26:
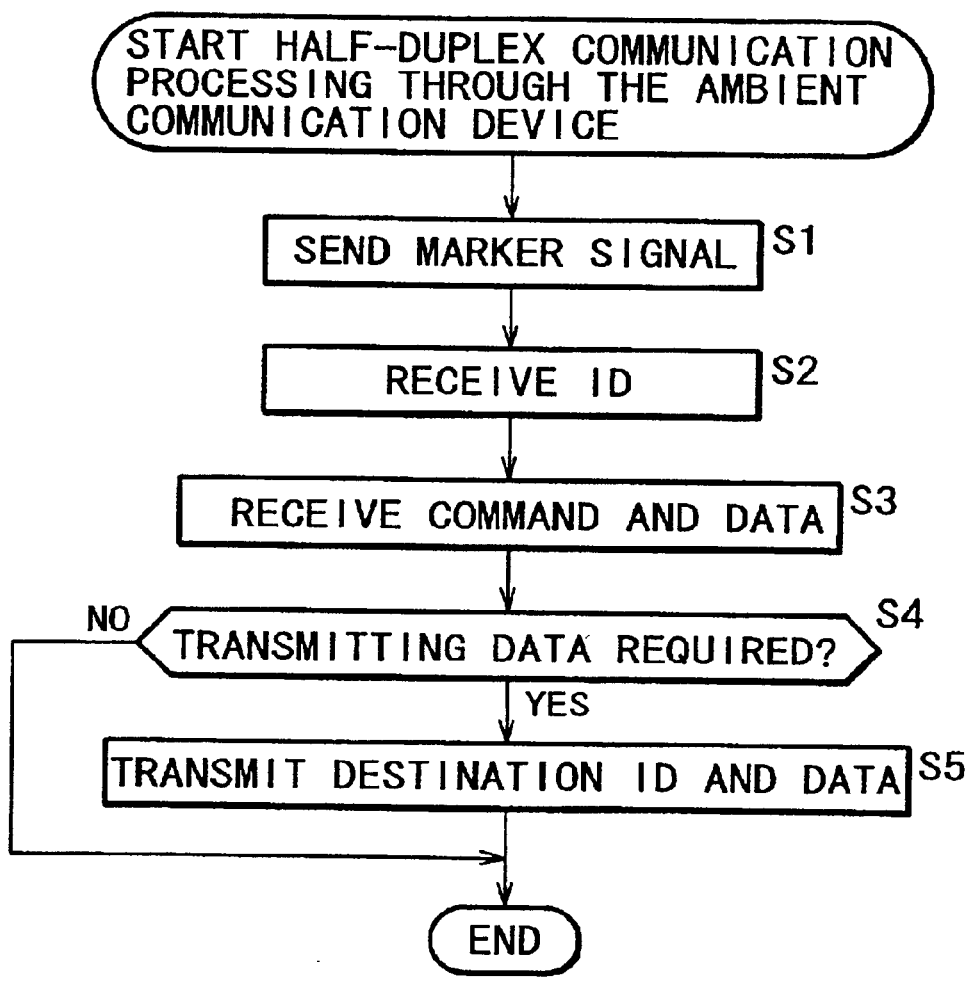
FIG. 26 is a flowchart for explaining about a half-duplex communication processing by an ambience-side communication device whose transmitting and receiving terminal is an input device 2 of FIG. 23.

Referring to a flowchart of FIG. 26, it will be explained about a half-duplex communication processing through the ambience-side communication device whose transmission and reception terminal is the input device 2 of FIG. 23.

At Step S1, the ambience-side communication device outputs a marker signal from the linear electrodes 21Xi and 21Yi of the input device 2. The marker signal is periodically transmitted, in which detection is performed whether or not the user (human body 1) touches the input device 2. A period when the marker signal is transmitted is defined as a time when it is sufficient to detect the user, e.g. 10 ms (100 Hz).

The communication device 310 that receives the marker transmitted by the ambience-side communication device transmits an ID (Identifier) as an identification signal.

At Step S2, the ambience-side communication device 310 receives the ID transmitted by the communication device 310. The ambience-side communication device identifies the received ID and recognizes the communication device 310.

When the communication device 310 transmits the ID, if necessary, the unit 310 transmits a command and data. Then, at Step S3, the ambience-side communication device receives the command and the data transmitted by the communication device 310. The ambience-side communication device 310 identifies a transmission end of the received command and data and processes the command and the data based on the previously received ID.

At Step S4, the ambience-side communication device that processes the command and the data, determines whether or not data such as a processed result is (are) transmitted. When judging that the transmission should be required, proceeding to Step S5, the ambience-side communication device adds the destination end ID to the data to be transmitted, transmits the added one by way of the linear electrode of the input device 2, and completes the communication processing.

At Step 4, when judging that the transmission of the data is not required, the ambience-side communication device completes the communication processing.

Figure 27:
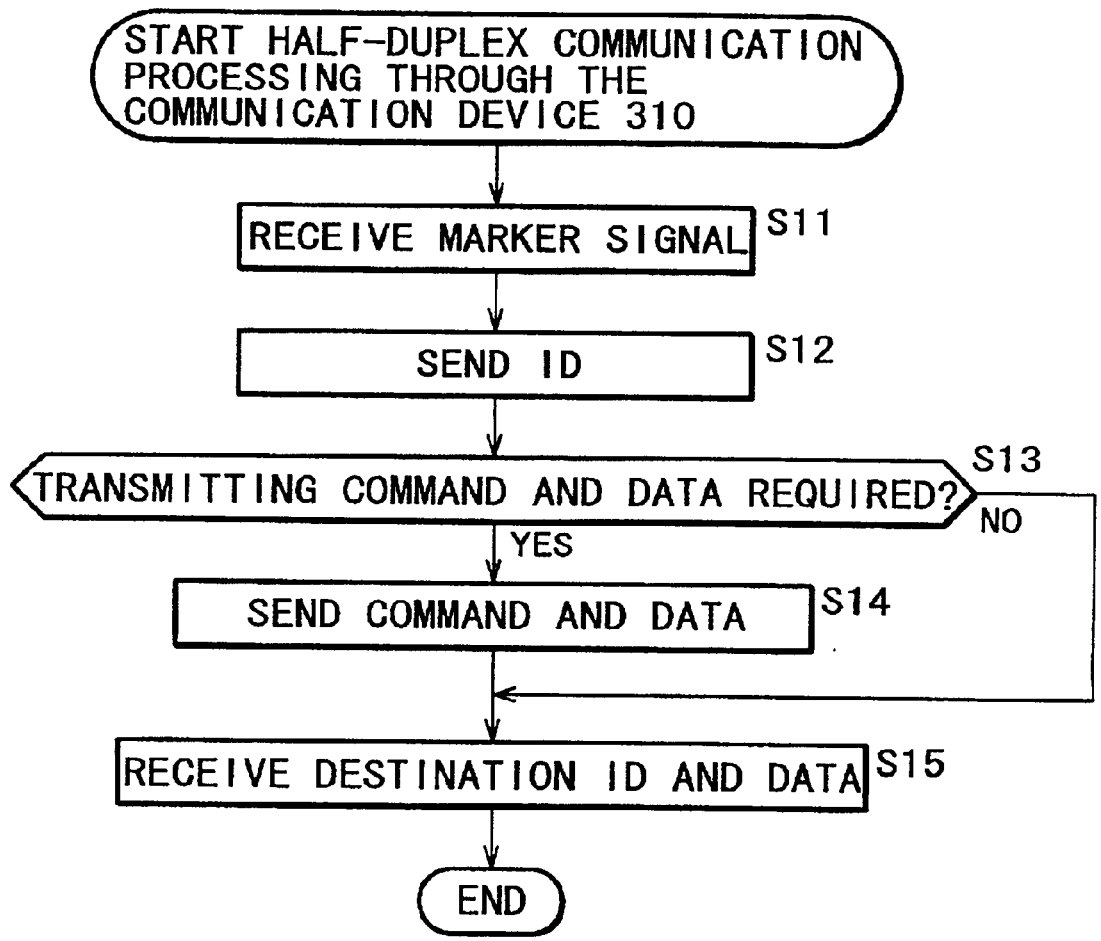
FIG. 27 is a flowchart for explaining about a half-duplex communication processing by the communicating device 310 of FIG. 23.

Next, referring to a flow chart of FIG. 27, it will be explained about a half-duplex communication processing by the communication device 310 (the wearable end communication device) corresponding to the flow chart of the ambience-side communication device of FIG. 26.

The communication device 310 is set in a reception mode as an initial state. At Step S11, the communication device 310 receives the marker signal transmitted by the ambience-side communication device. The communication device 310 received the marker signal transmitted by the ambience-side communication device changes over the reception mode to a transmission mode. At Step S12, the communication 310 transmits an ID as identification information.

At Step S13, the communication device 310 that transmits the ID judges whether or not transmission of a command and data are required to the ambience-side communication device. When judging that determining the transmission is required, proceeding to Step S14, the communication device 310 transmits the command and the data.

At Step S15, the communication device 310 that transmits the command and the data, receives the data to which the destination end ID coincident with his/her own ID transmitted by the ambience-side communication device and completes the processing.

At Step S13, when judging that the transmission of the command and the data is not required, the communication device 310 proceeds to Step S15 without any transmission of the command and the data.

Thus, the ambience-side communication device and the communication device 210 perform the half-duplex communication processing.

For example, in a communication protocol used for the above-mentioned communication, the number of data bit of 8 bits is allotted to the marker. The number of data bit of 16 bits is allotted to the ID of the communication device 310, including an ECC (error correcting code) used for data error correction. The number of data bit of 32 bits is allotted to the command and the data to be transmitted to communication device 310. The number of data bit of 32 bits is allotted to the ID and the data of the communication device 310 to be transmitted by the ambience-side communication device. Then, an amount of data of communication performed in a one cycle of the marker signal becomes 88 bits.

When a communication speed of communication performed between the communication device 310 and the ambience-side communication device is set to be 10 Kbps, a necessary time for communicating 88 bit data becomes 8.8 ms. Even when the cycle of the marker signal is 10 ms, the communication there between is possible. Further, when a communication speed is set by 100 Kbps, in order not to generate a communication error, to strengthen error correction operation and usage of a communication protocol to which a handshake function under a flow control is added, is possible.

Figure 28:
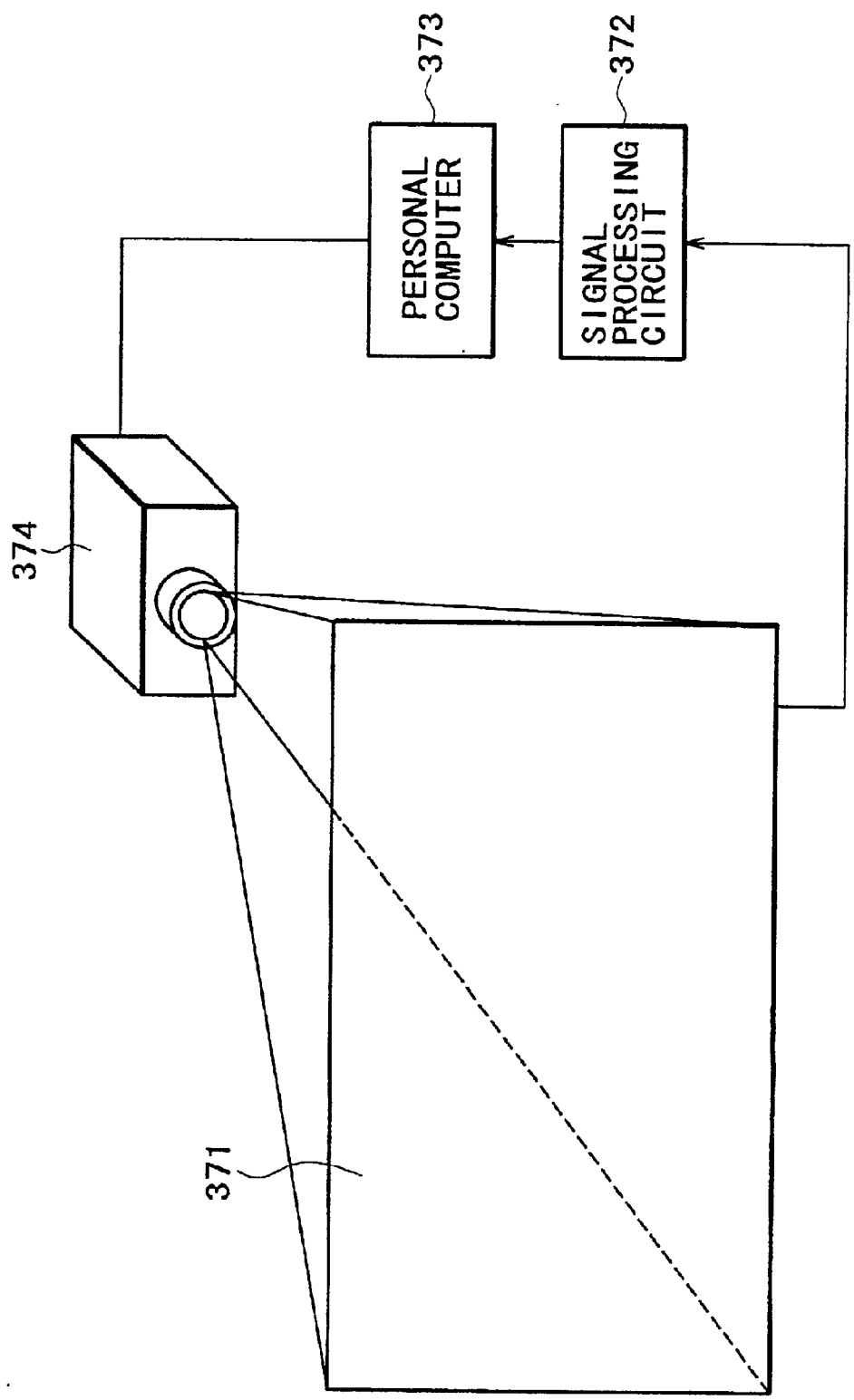
FIG. 28 shows an example of the other information processing system to which the present invention is applied.

FIG. 28 shows an example of the other construction of the information system to which the present invention is applied.

A display screen 371 in which the linear electrodes are provided in a same manner as the input device 2 has a substrate of half-transparent material. The display screen 371 projects an image from backward by a projector 374. When the user touches the linear electrode of the display screen 371 by way of the finger, etc., an inducing voltage is generates at the linear electrode. The display screen 371 supplies the inducing voltage to a signal processing circuit 372. The signal processing circuit 372 calculates a coordinate on the display screen 371 in which the inducing voltage is generated, identifies the user, and supplies information of the processed result to the personal computer 373. A personal computer 373 receives an input, generates a predetermined image, controls the projector 374, and projects the image onto the display screen 371, based on the information.

As above-mentioned, the personal computer 373 can project the information such as the coordinate at which the user touches the display screen 1 onto the display screen 371 being the input device, by controlling the projector 374.

Figure 29:
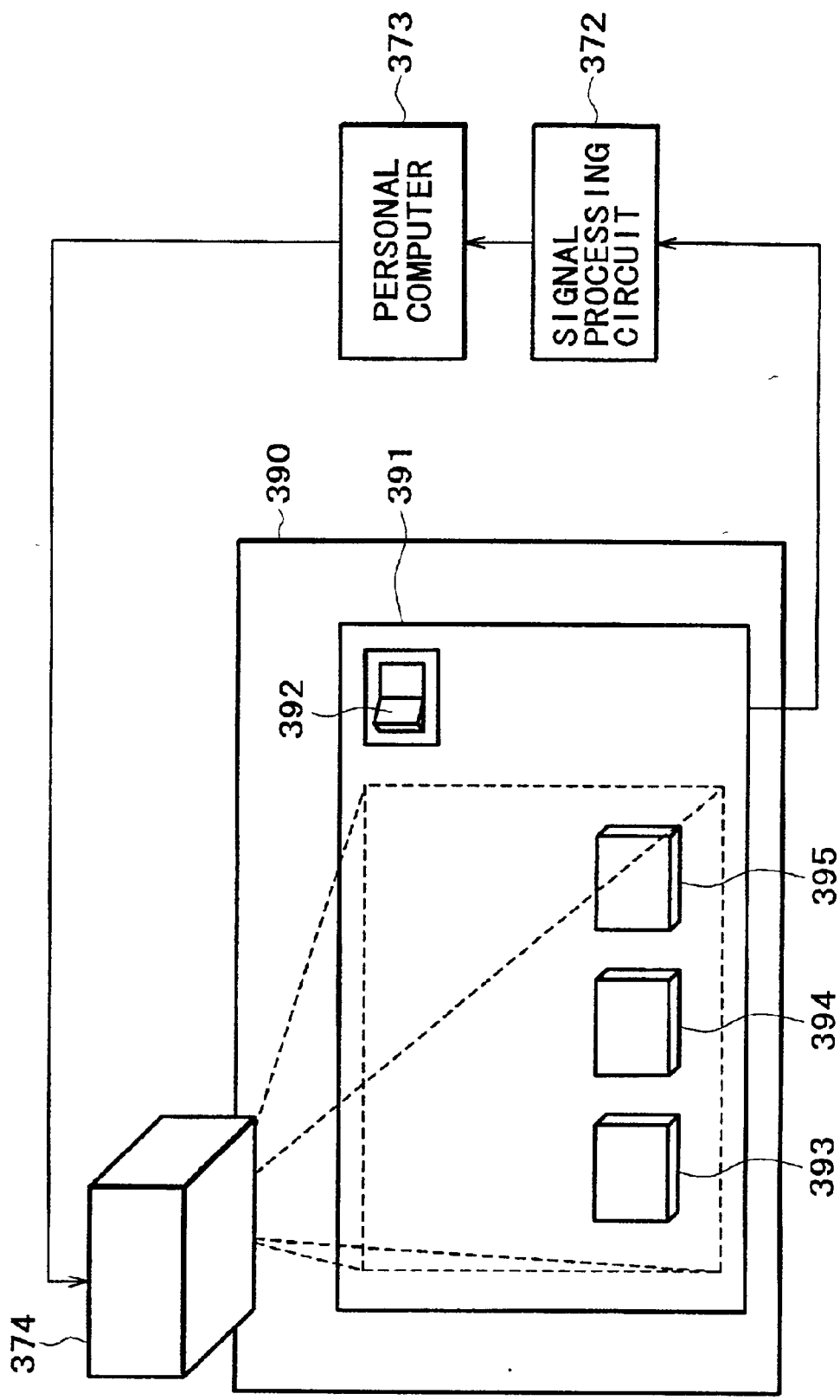
FIG. 29 shows a further example of the other information processing system to which the present invention is applied.

FIG. 29 shows an example of the other construction of the information processing system to which the present invention is applied.

A display screen 391 in which linear electrodes are provided in a same way as the input device 2 is made of flexible material and provided on a wall 390. For example, the display screen 391 forms the electrodes by patterning a polyamide substrate and vaporizing the electrode material onto plastic substrate and the like.

The display screen 391 detects an inducing voltage generated by the user's touching the display screen 391 and supplies the detected voltage to a signal processing circuit 372. The processing circuit 372 calculates a coordinate on the display screen 391 in which the inducing voltage is generated, identifies the user (communication device), and supplies the information of the calculated one to the personal computer 373. The personal computer 373 controls the projector 374, projects a predetermined image onto the display screen 391, and performs a processing based on the information supplied from the signal processing circuit 372. The projector 374 projects the image information supplied from the personal computer 373 from frontward on the display screen 391.

A switch 392 is e.g. a switch for illumination that is provided on the wall 390. The display screen 391 is provided, covering the switch with itself. Further, the personal computer 373 recognizes a coordinate of the switch 392 on the display screen 391.

Switches 393 to 395 are formed by images projected on the display screen 391 by the projector 374. When the user operates the switches 393 to 395 with a finger and the like, i.e., when the user touches any linear electrodes at positions onto the switches 393 to 395 are projected, a processing corresponding to each of the switches is performed.

Following will be explained about the operation. When the user operates the switch 392, i.e., when the user touches a linear electrode at a position of the switch 392, an inducing voltage generated on the display screen 391 is supplied to the signal processing circuit 372. The signal processing circuit 372 detects a coordinate from which the inducing voltage is generated, identifies the user (communication device), and supplies the information to the personal computer 373.

The personal computer 373 identifies the user who touches the switch 392 based on the information supplied from the signal processing circuit 372. Then, the personal computer 373 displays a specified image onto the display screen 391 and the like, i.e. performs a preset processing.

Further, when the user touches a linear electrode at any of positions on which the switches 393 to 395 are projected, an inducing voltage that is generated on the display screen 391 is supplied to the signal processing circuit 372. The signal processing circuit 372 detects a coordinate at which the inducing voltage is generated, identifies the user (communication device), and supplies the information to the computer 373.

The personal computer 373 identifies the user who touches the display screen 391 and identifies the switch that the user touches, based on the information supplied from the signal processing circuit 372. Then, the personal computer 373 displays a specified image onto the display screen 391 and the like, i.e. performs a preset processing by each of the switches.

In the above-mentioned, the number of the switches projected onto the projector 374 is three, consisting of the switches 393 and 395. However,the number is not limited thereto. Any number is available. Further, each of the switches may be provided at any position, if the position lies within an area where the projector 374 is projected. Further, setting of the positions, the number, and the corresponding processes and the like of these switches are different by the user. For example, setting of the user who operated the switch 392 may be displayed on the display screen 391.

Further, the computer 373 controls illumination and the other units (not shown in the figure) and the like. In the other hand, the user operates the switches 393 to 395. Thereby, these units may be controlled.

As above-mentioned, using the present invention, without making the user notice a device relating of the invention, a ubiquitous computing environment can be constructed that actively backups a human life.

FIG. 30 shows an example of construction in which an input device is used that is constructed by the resistor array formed in a manner.

An input device 410 is formed by a resistor array in a manner. Electrodes 411X1 and 411X2 are detection conductors (i.e. electrodes) that detects an input level in Y-axis direction. Electrodes 411Y1 and 411Y2 are detection conductors (i.e. electrodes) that detects an input level in X-axis direction.

A linear amplifier 412X amplifies a signal detected at the electrode 411X1 and outputs the amplified signal to a differential amplifier 417X and a low-pass filter 413.

Linear amplifiers 412X2, 412Y1, and 412Y2 respectively amplify each of signals that is detected at the electrodes 411X2, 411Y1, and 411Y2. The linear amplifier 412X2 outputs the amplified signal to an inverter 416X2 and the low-pass filter 413. The linear amplifier 412Y1 outputs the amplified signal to a differential amplifier 417Y and the low-pass filter 413. And, the linear amplifier 412Y2 outputs the amplified signal to an inverter 416Y2 and the low-pass filter 413.

The low-pass filter 413 smoothes outputs of the linear amplifiers 412X1, 412X2, 412Y2, and 412Y2 and supplies the smoothed outputs to an A/D conversion unit 414. The A/D conversion unit 414 converts each of the outputs of the low-pass filter 415 into digital data and detects a coordinate. The detected coordinate is output from an output terminal 415 to e.g. a personal computer or the like.

Further, the inverter 416X2 inverts an output of the linear amplifier 412X2 and supplies the inverted output to the differential amplifier 417X. Likewise, the inverter 416Y2 inverts an output of the linear amplifier 412Y2 and supplies the inverted one to the differential amplifier 417Y.

The differential amplifier 417X makes difference between the output of the linear amplifier 412X1 and the output of the inverter X2 amplify in a saturation manner, regards the amplified one in the saturation manner as a logic level output, and outputs the logic level output to an adder 418. The differential amplifier 417Y makes difference between the output of the linear amplifier 412Y1 and the output of the inverter Y2 amplify in a saturation manner, regards the amplified one as a logic level output in the saturation manner, and outputs the logic level output to the adder 418.

The adder 418 adds the output of the differential amplifier 417X to the output of the differential amplifier 417Y and outputs the added one to a demodulator 419. The demodulator 419 demodulates the output of the adder 418 and outputs the demodulated one to e.g. the personal computer or the like.

Following will be explained about the operation. When the user touches the resistor array of the input device 410 with the finger or the like, a signal obtained by modulating an identification information in an FM manner is transmitted to the input device 410 by way of the human body 1. The signal that is transmitted to the resistor array of the input device 410 is detected by the electrodes 411X1, 411X2, 411Y1, and 411Y2. Then, magnitude of the signal to be detected at the electrodes 411X1, 411X2, 411Y1, and 411Y2 is substantially inversely proportional to a distance between a position where the user touches the input device 410 and each of the electrodes (i.e., resistor value).

The signal that is detected at the electrode 411X1 is amplified by the linear amplifier 412X1. Likewise, the signal that is detected at the electrodes X2, 411Y1, and 411Y2, each is supplied to the linear amplifiers 412X2, 412Y1, and 411Y2 and the supplied signals are amplified by the amplifiers 412X2, 412Y1, and 411Y2.

The low-pass filter 413 smoothes each of outputs of the linear amplifiers 412X1, 412X2, 412Y1, and 412Y2 and outputs the smoothed ones to the A/D conversion unit 414. The A/D conversion unit 414 converts each of the signals outputted from the low-pass filter 413 into digital data and outputs the digital one from the output terminal 417 to the personal computer. The personal computer detects an X coordinate from a ratio of the output of the linear amplifier 412Y1 to the output of the linear amplifier 412Y2 and detects a Y coordinate from a ratio of the output of the linear amplifier 412X1 to the output of the linear amplifier 412X2.

The inverter 416X2 inverts a phase of the output signal of the linear amplifier 412 X2 and outputs the inverted signal to the differential amplifier 417X. Likewise, the output signal of the linear amplifier 412 Y2 is supplied to the differential amplifier 417Y, a phase of the output signal is inverted, and outputted the inverted output signal to the differential amplifier 417Y.

The differential amplifier 417X amplifies difference between the output of the linear amplifier 412X1 and the output of inverter 418X2 in a saturation manner and outputs the amplified one in the saturation manner as a logic level output to the adder 418. Likewise, the differential amplifier 417Y amplifies difference between the output of the linear amplifier 412Y1 and the output of inverter 418Y2 in a saturation manner and outputs the amplified one in the saturation manner as a logic level output to the adder 418. Namely, the differential amplifiers 417X and 417Y outputs the signal as shown in FIG. 22B, when the signal as shown in FIG. 22A as above-mentioned is inputted.

The adder 418 adds the output of the differential amplifier 417X to the output of the differential amplifier 417Y and outputs the added one to the demodulator 419. The demodulator 419 demodulates the output signal from the adder 418 and outputs identification information of the transmitter 221 (i.e. an information that is expressed in a logical manner as shown in FIG. 22B) from the output terminal 422 to a personal computer.

As above-mentioned, detection of the coordinate at which the user touches the input device 410 having the resistor array in a manner and the identification of the user (transmitter 221) becomes possible.

Optionally, in the present specification, a step of writing a program relating to performance of the present invention to be recorded on a recording medium includes not only a process to be performed along the written order in a time-sequential manner but also a process to be performed in a parallel manner or a discrete manner.

Further, therein, the "system" denotes a whole of an apparatus constructed by a plurality of devices or units.

What is claimed is:

1. An information processing apparatus comprising:
   generator means for generating an alternating current signal;
   inducing means for inducing said alternating current signal to a human body, such that the human body generates an induced signal; and
   a detector for detecting and phase locking the induced signal with said alternating current,
   wherein the detector includes a latch circuit configured with the induced signal as an input and said alternating current signal as a clock.

2. The information processing apparatus according to claim 1, wherein said generator means generates said alternating current signal that can be identified with respect to an alternating current signal generated by another information processing apparatus.

3. The information processing apparatus according to claim 1, wherein said inducing means induces the alternating current signal to the human body from an available power supply through surrounding environment.

4. The information processing apparatus according to claim 1, wherein the detector includes a comparator to phase lock the induced signal with said alternating current signal.

5. The information processing apparatus according to claim 4, wherein the detector further includes an amplifier coupled to the comparator, said amplifier configured to receive the induced signal and amplify the induced signal before outputting the signal to the comparator.

6. The information processing apparatus according to claim 5, wherein the detector further includes a smoothing circuit coupled to the amplifier and the comparator, said smoothing circuit configured to receive the amplified induced signal and smoothing the signal before outputting the smoothed signal to the comparator.

7. An information processing apparatus comprising:
   inducing means extending in a first and a second directions and inducing an inducing voltage from a neighboring human body, such that inducing of said inducing voltage from the neighboring human body is enabled by a first signal;
   inducing voltage detection means for detecting said inducing voltage using said first signal as a reference signal to phase lock said inducing voltage; and
   coordinate detecting means for detecting a coordinate at which said inducing means induces said inducing voltages,
   wherein said inducing voltage detection means includes a latch circuit configured with the inducing voltage as an input and said first signal as a clock.

8. The information processing apparatus according to claim 7, further comprising:
   frequency identification means for identifying a frequency of said inducing voltage.

9. The information processing apparatus according to claim 8, wherein
   said frequency identification means identifies a frequency of a commercial power supply as said frequency of said inducing voltage.

10. The information processing apparatus according to claim 8, wherein
    said frequency identification means identifies a frequency of a signal outputted from a second information processing apparatus worn a human body as said frequency of said inducing voltage.

11. The information processing apparatus according to claim 10, further comprising:
    reception means for receiving information transmitted from said second information processing apparatus worn on said human body.

12. The information processing apparatus according to claim 10, further comprising:
    transmission means for transmitting, by way of said human body, information to said second information processing apparatus worn on a human body.

13. The information processing apparatus according to claim 7, wherein said first signal is an alternating current signal from a commercially available power supply.

14. The information processing apparatus according to claim 7, wherein said inducing voltage detection means includes a comparator to phase lock the inducing voltage with said first signal.

15. An information processing method comprising the steps of:
    inducing an inducing voltage from a neighboring human body by way of inducing means extending in a first direction and a second direction, such that inducing of said inducing voltage from the neighboring human body is enabled by a first signal;

detecting said inducing voltage using said first signal as a reference signal to phase lock said inducing voltage; and detecting a coordinate at which said inducing step induces said inducing voltages wherein phase locking includes latching the inducing voltage with said first signal used as a clock.

16. The information processing method according to claim 15, wherein said inducing step includes inducing the first signal onto the human body through surrounding environment from an available power supply.

17. The information processing method according to claim 15, wherein said detecting step includes phase locking the inducing voltage with said first signal.

18. The information processing method according to claim 17, wherein phase locking includes comparing the inducing voltage with said first signal.

19. An information processing apparatus comprising:

a generator to generate an alternating current signal;

inducing means for inducing said alternating current signal to a human body, such that the human body generates an induced signal; and a detector including a detection area, said detector operating to determine the coordinate within the detection area where the human body came in contact with the detector by detecting and phase locking the induced signal with said alternating current, wherein the detector includes a latch circuit configured with the induced signal as an input and said alternating current signal as a clock.

* * * * *